United States Patent
Sugitani

(10) Patent No.: US 8,235,862 B2
(45) Date of Patent: Aug. 7, 2012

(54) PLANETARY GEAR DEVICE

(76) Inventor: Nobuyoshi Sugitani, Susono (JP)

( * ) Notice: Subject to any disclaimer, the term of this patent is extended or adjusted under 35 U.S.C. 154(b) by 809 days.

(21) Appl. No.: 11/990,023

(22) PCT Filed: Aug. 10, 2005

(86) PCT No.: PCT/JP2005/014637
§ 371 (c)(1),
(2), (4) Date: Feb. 5, 2008

(87) PCT Pub. No.: WO2007/017935
PCT Pub. Date: Feb. 15, 2007

(65) Prior Publication Data
US 2010/0167867 A1    Jul. 1, 2010

(51) Int. Cl.
*F16H 57/08*    (2006.01)
(52) U.S. Cl. .................................. 475/341; 475/339
(58) Field of Classification Search ............... 475/338, 475/339, 340, 341, 342
See application file for complete search history.

(56) References Cited

U.S. PATENT DOCUMENTS

| | | | | |
|---|---|---|---|---|
| 3,675,510 A * | 7/1972 | Duggar, Jr. | ...................... | 475/342 |
| 3,939,736 A * | 2/1976 | Morin | ........................... | 475/338 |
| 4,366,727 A * | 1/1983 | Jonsson | ........................ | 475/342 |
| 4,850,247 A * | 7/1989 | Yu | ................................ | 475/342 |
| 4,864,893 A * | 9/1989 | Hori | ............................. | 475/341 |
| 5,078,665 A * | 1/1992 | Castellani | .................... | 475/342 |
| 6,348,022 B1 * | 2/2002 | Jin | ................................ | 475/342 |
| 6,585,620 B1 | 7/2003 | Bae | | |
| 2001/0036880 A1 * | 11/2001 | Baker, Jr. | ..................... | 475/339 |

FOREIGN PATENT DOCUMENTS

| | | | |
|---|---|---|---|
| EP | 0338369 A2 * | 10/1989 | |
| EP | 0559626 A1 * | 9/1993 | |
| JP | S51-053159 | 5/1976 | |
| JP | H01-073548 | 5/1989 | |
| JP | 2000-274495 | 10/2000 | |
| JP | 2001-317598 | 11/2001 | |
| JP | 2003-194158 | 7/2003 | |
| JP | 2004-019900 | 1/2004 | |

OTHER PUBLICATIONS

"Design Calculation of Planetary Gear and Differential Gear" Muneharu Morozumi; Kabusikikaisha Sankeishuppansha; Jun. 1984; p. 124-p. 128.
"Involute Profile Shifted Gears"; Takashi Nakata; The Japan Society of mechanical Engineers; Feb. 21, 1994; p. 177-p. 184.

* cited by examiner

*Primary Examiner* — Roger Pang
(74) *Attorney, Agent, or Firm* — Manabu Kanesaka

(57) ABSTRACT

A planetary gear has at least two, first and second gears having different numbers of teeth. One of sun outer gears or sun inner gears having two fundamental axes has at least two, third and fourth gears capable of respectively meshing with the first and second gears of the planetary gear and of rotating relative to each other. The ratio of the numbers of the teeth of the first gear and the third gear is different from that of the second gear and the fourth gear. The other of sun outer or sun inner gears having one fundamental shaft coaxially integrally has at least two, fifth and sixth gears respectively meshing with the first and second gears.

13 Claims, 8 Drawing Sheets

PLANETARY GEAR DEVICE

TECHNICAL FIELD

The present invention relates to a planarity gear device, more specifically, a planetary gear device including a 3K-type planetary gear mechanism in which three fundamental axes (drive axis, input axis, and fixed axis) of the planetary gear mechanism are all K-components having the same rotation axis as the central axis of the device.

BACKGROUND ART

As a matter of course, mechanical components support civilization and form the foundation of industries, and it is not an exaggeration to say that the fundamental working principles of a gear mechanism as one type of mechanical component had all been mostly invented in Greek or Roman times and led the way to the present. Therefore, during these last one hundred years, the only notable inventions are harmonic gears and mechanical paradox gears. In gear mechanisms having such a long history, it is not too much to say that high efficiency and high reduction gear ratios are eternal dreams. Gear mechanisms which are structurally simple, realize high reduction gear ratios, great torque transmission, and high efficiency have been pursued for many years and many researchers have been engaged in the realization of these.

Recently, according to the present inventions of harmonic gears, the reduction gear ratio and efficiency of the mechanisms have been improved to some degree, and at present, these are dominant in many mechanical fields. However, the harmonic gears have fewer teeth meshes, and they are not suitable for transmitting a great torque. Therefore, there is great expectation for mechanical paradox gears as one type of conventional planetary gear mechanism which includes more teeth meshes, does not require special gears, and can be easily downsized.

The mechanical paradox gear mechanism (Furgusson's Mechanical Paradox Gear) includes two gears having different numbers of teeth attached to one shaft mesh with another common gear, and from a long time ago, it has been used for variable capacitor dial mechanisms for radios and propeller variable pitch mechanisms, etc. A planetary gear using the mechanical paradox gear mechanism is a mechanical paradox planetary gear device, and M. Morozumi has studied this. The mechanical paradox planetary gear is superior to the harmonic gear in the point that the mechanical paradox planetary gear realizes an extremely great reduction gear ratio by a simple structure, includes more teeth to mesh with each other, and can transmit a great torque.

Recently, a mechanical paradox planetary gear has been made practicable as an extremely small gear to be used in a printer or the like, and mechanical paradox planetary gears have attracted wider attention, however, in principle, it has been a mechanism in which a pair of gears mesh with each other, so that it has been pointed out that the mechanism is still insufficient in efficiency due to its low-strength teeth and small transmittable torque, and, it must be said that the degree of completion as a gear mechanism is low.

Patent Document 1: Japanese Published Unexamined Patent Application No. 2000-274495
Patent Document 2: Japanese Published Unexamined Patent Application No. 2004-19900
Patent Document 3: Japanese Published Unexamined Patent Application No. 2003-194158
Patent Document 4: Japanese Published Unexamined Patent Application No. 2001-317598
Non-Patent Document 1: Muneharu Morozumi, "Design Calculation of Planetary Gear and Differential Gear," KABUSHIKIKAISHA SANKEISHUPPANSHA, June 1984
Non-Patent Document 2: Takashi Nakata, "Profile Shifted Gear," The Japan Society of Mechanical Engineers, February 1994

DISCLOSURE OF THE INVENTION

Problem to be Solved by the Invention

Conventional mechanisms which realize great reduction gear ratio, for example, harmonic gears and mechanical paradox gears are all incomplete as mechanisms, and are not advantageous mechanisms for realizing efficient high-torque transmission with a great reduction gear. Therefore, this problem cannot be fundamentally solved by changing the specifications such as the tooth profile and the number of teeth.

(3K-Type Conventional Technique)

There are many types of planetary gear devices, however, recently, Kudriavtsev's classification has been generally used. The planetary gear mechanism includes three fundamental axes of a drive axis (input axis), a driven axis (output axis), and a fixed axis (bound axis) and these fundamental axes are arranged coaxially. When the axis of sun gears (including a sun outer gear and a sun inner gear) is defined as K, a carrier axis is defined as H, and a planetary gear axis is defined as V, planetary gear mechanisms are classified into a 2K-H type, a 3K type, a K-H-V type, and a composite planetary gear mechanism including two or more 2K-H type mechanisms joined to each other. As mechanical paradox planetary gears, a 3K type and a 2K-H type are known, and Patent Documents 1 through 4 relate to 3K type mechanical paradox planetary gears.

Additionally, with regard to a planetary gear mechanism including a mechanical paradox planetary gear, for example, in Non-Patent Document 1, the speed ratio, the efficiency, and the axial torque are exhaustively analyzed. Therefore, in the conventional technique, 3K type mechanical paradox planetary gears and similar normal 3K type planetary gears are theoretically widely known, and this technique has been established.

The present invention relates to a gear mechanism different from the conventional technique of 3K type planetary gear mechanisms. Therefore, to make clear the difference from the conventional technique and describe the technical superiority of the present invention, conventional gear mechanisms will be described in detail.

(Classification of 3K Type Planetary Gear Mechanisms)

The 3K type includes two mechanisms. The two mechanisms are a mechanism (referred to as type I) in which three axes of a fixed axis, a driven axis, and a drive axis are assigned to two sun inner gears (ring gears) and one sun outer gear (sun gear), and a mechanism (referred to as type II) in which the axes are assigned to two sun outer gears and one sun inner gear. Generally, in the type I, one of the sun inner gears is a fixed axis, and the other is a driven axis, and the sun outer gear is a drive axis. In the type II, one of the sun outer gears is a fixed axis and the other is a driven axis, and the sun inner gear is a drive axis. Both of these are mechanisms for obtaining great speed reduction.

As a matter of course, in a planetary gear mechanism, if the fixed axis is not fixed (bound) and the drive axis cannot obtain a reactive force with respect to the fixed axis, the fixed axis and the driven axis cannot be relatively rotatively displaced, and they serve as rigid bodies. In other words, according to a reactive force of the drive axis from the fixed axis, the driven axis is driven to output relative rotation with a reduced speed with respect to the fixed axis.

The present invention relates to both of type I and type II, and the conventional technique of type I and the conventional technique of type II will be shown, and a novel mechanism of the present invention will be compared with the conventional techniques and superiority of the present invention will be described in detail.

(Definition of Detailed Classification of 3K Type Planetary Gear Mechanisms)

Next, regarding 3K type planetary gears, a mechanical paradox planetary gear as a typical conventional technique, a conventional planetary gear which is not a mechanical paradox planetary gear, and a novel planetary gear mechanism of the present invention will be described. Therefore, in combination of these three mechanisms and the above-described type I and type II, for convenience, type I mechanisms will be referred to as the "3K-I type mechanical paradox planetary gear," the "3K-I type normal planetary gear mechanism," and the "novel 3K-I type planetary gear mechanism of the present invention." In combination with type II, the "3K-II type mechanical paradox planetary gear," the "3K-II type normal planetary gear mechanism," and the "3K-II type planetary gear mechanism of the present invention" are referred to.

<3K-I Type Mechanical Paradox Planetary Gear Mechanism>

FIG. 1 is a skeleton diagram of a 3K mechanical paradox planetary gear belonging to the conventional 3K-I type. The reference symbol A denotes a sun outer gear, the reference symbol B denotes a planetary gear, and the reference symbols C and D denote sun inner gears.

The mechanical paradox gear mechanism is a mechanism in which two gears with different numbers of teeth attached to one axis mesh with another common gear. Therefore, in the mechanical paradox planetary gear mechanism, two gears with different numbers of teeth that mesh with one planetary gear are provided as the sun outer gear (sun gear) or the sun inner gear (ring gear).

Therefore, in the sun outer gear or sun inner gear, to mesh the two gears with different numbers of teeth with the same gear of another axis, extreme profile shifting is always necessary.

Specifically, at the same axis-to-axis distance, to establish gears to mesh with each other of a gear of one axis with a fixed number of teeth and gears of another axis with different numbers of teeth, the gears inevitably deviate from the normal shape as gears. When the axis-to-axis distance is determined and the number of teeth and module of the gear of one axis are determined, the module of the other axis is the same and the gear ratio of the other axis is determined by the number of teeth that divides internally the axis-to-axis distance. Therefore, to allow the gears of the other axis to have two different numbers of teeth, profile shifting is applied to change the meshing pitch circle. Therefore, according to excessive profile shifting, the slip factor is high and the efficiency is low, and in the worst case, a locked state that rotation is not normally transmitted occurs.

In the case of the 3K-I type, to two sun inner gears C and D and one sun outer gear A, three fundamental axes of a drive axis, a driven axis, and a fixed axis are assigned. Hereinafter, the most general case, that is, the case where the sun outer gear A is set on a drive axis, the sun inner gear C is set on a driven axis, and the sun inner gear D is set on a fixed axis will be described by using Non-Patent Document 1 (pp. 124-128) as an example.

In this example, the numbers of teeth of the gears A, B, C, and D are set to $Za=24$, $Zb=25$, $Zc=72$, and $Zd=75$, and the sun outer gear A is set on a drive axis, the sun inner gear D is set on a fixed gear, and the sun inner gear C is set on a driven axis. The number of planetary gears to be arranged (hereinafter, referred to as "the number of arranged planetary gears") is three, and as described in Non-Patent Document 1, the speed ratio $u=1/100$, and a reduction gear ratio is 100 and this is an extremely great reduction gear ratio.

When the planetary gears are in the same phase, conditions for meshing with the sun outer gear and the sun inner gear are the number (3 in this example) of arranged planetary gears being a common divisor of the number of teeth of the sun outer gear and the numbers of teeth of the sun inner gears. Therefore, in this example, the numbers of teeth $Za$, $Zc$, and $Zd$ of the sun outer gear A and the two sun inner gears C and D have a divisor of 3, and the planetary gears B mesh with the sun outer gear A and the sun inner gears C and D with exactly the same phase relationship.

As Non-Patent Document 1 describes "to design a 3K type planetary gear device using a mechanical paradox planetary gear, meshing center distances of the gears must be calculated so as to become equal to each other by using the profile shifted gear theory, and in addition, to equally allocate the total load to several planetary gears, assembly conditions of these must be satisfied," in the mechanical paradox planetary gear, two sun inner gears with different numbers of teeth are meshed with the same planetary gear. Therefore, as the difference in number of teeth between the two sun inner gears becomes larger, the shift coefficient difference between the gears to mesh at the same mesh center distance becomes larger, and as the difference in number of teeth between two sun inner gears increases, the reduction gear ratio to be outputted becomes smaller than 100, and the superiority of the mechanical paradox planetary gear is lost.

Due to the constraints as a planetary gear mechanism in which sun inner gears with different numbers of teeth are meshed with the same planetary gear, the number-of-teeth difference between the two sun inner gears and the number of arranged planetary gears are equal to each other, and the shift coefficient difference between the two sun inner gears which mesh with the same planetary gear while having different numbers of teeth increases according to the number of arranged planetary gears, that is, the number-of-teeth difference between the two sun inner gears. Therefore, unless the number of arranged planetary gears is small, the gears do not work due to the shift coefficients.

When the shift coefficients of the gears A, B, C, and D are defined as $Xa$, $Xb$, $Xc$, and $Xd$, in this example, $Xa=0.0191$, $Xb=0.1671$, $Xc=0$, and $Xd=1.705$. That is, the annular gear C has a shift coefficient close to a limit as a gear.

The problems of the 3K-I type mechanical paradox planetary gear are as follows:

(1) It has a constraint of the number of arranged planetary gears and the number-of-teeth difference between gears on a driven axis and a fixed axis being equal to each other, and as a result, the number of arranged planetary gears is small. Therefore, the transmittable torque is small.

(2) When the number-of-teeth difference and the number of arranged planetary gears are equal to each other, the planetary gears mesh with the sun outer gear and the sun inner gears with exactly the same phase relationship. Therefore, the phases of the planetary gears do not overlap each other, and therefore, smooth rotation transmission is not obtained.

(3) As long as the gear mechanism has a constraint of the number of arranged planetary gears and the number-ofteeth difference between gears on a driven axis and a fixed axis being equal to each other, a large shift coefficient is inevitably necessary, and therefore, a slip factor is high, and a gear mechanism with high efficiency cannot be realized. Particularly, the loss accounts for a high percentage of a region with a small torque, and the efficiency lowers.

(4) The two sun inner gears have a number-of-teeth difference equal to the number of arranged planetary gears, and the two sun inner gears have a speed ratio difference corresponding to the number-of-teeth difference. Therefore, there is a limit to reduce the speed ratio difference and increase the reduction gear ratio of the mechanical paradox planetary gear.

(5) If the speed ratio difference is large, the planetary gear receives different forces from the sun inner gears at mesh positions apart from each other, and a force to fall down in the circumferential direction of the sun outer gear in proportion to the speed ratio difference is generated, a biased stress occurs at the ends of the planetary gear and the sun inner gears, and biased wearing occurs at the ends. Therefore, the gear mechanism is poor in durability. In other words, a gear with a small speed ratio difference and a great reduction gear ratio is excellent in durability, however, it has a constraint of the number of arranged planetary gears and the number-of-teeth difference between gears on a driven axis and a fixed axis being equal to each other, and the gear is realized only in the range of the constraint.

<3K-I type normal planetary gear mechanism>

FIG. 2 is a skeleton diagram of a conventional 3K-I type normal planetary gear mechanism.

The 3K-I type normal planetary gear mechanism includes, in addition to a normal planetary gear mechanism including a sun outer gear A, a planetary gear B, a sun inner gear C, another planetary gear D which shares an axis with the planetary gear B, and a sun inner gear E that meshes with the planetary gear D. Most generally, the sun outer gear A is set on a drive axis, the sun inner gear E is set on a driven axis, and the sun inner gear C is set on a fixed axis, and this case will be described hereinafter.

When the numbers of teeth of the gears A, B, C, D, and E are defined as Za, Zb, Zc, Zd, and Ze, the speed ratio u is expressed as:

$$U = \frac{Za \cdot (Zb \cdot Ze - ZcZd)}{Zb \cdot Ze \cdot (Za + Zc)}$$ [Numerical formula 1]

For example, when Za=24, Zb=12, Zc=48, Zd=11, and Ze=47, the speed ratio u=1/47 and the reduction gear ratio is 47 that is the reciprocal of 1/47. In this case, the number of arranged planetary gears is 3.

Specifically, the possible number of arranged planetary gears is a divisor of the sum (72) of the number of teeth (24) of the sun outer gear (gear A) and the number of teeth (48) of the sun inner gear (gear C, and 3 is selected as the number of arranged planetary gears. When the number of teeth (Zd) of another planetary gear D sharing an axis with the planetary gear B is set to 11, the number of teeth (Ze) of the sun inner gear E that meshes with the planetary gear D is "Zd·Zc/Zb±"number of arranged planetary gears," so that 51 of "Zd·Zc/Zb±"number of arranged planetary gears" is selected. That is, the number (Ze) of teeth has a difference equal to the number of arranged planetary gears from the number of teeth (Zd·Zc/Zb) of the sun inner gear corresponding to the case where the number of teeth of the planetary gear changes from Zb to Zd. In a broad sense, the number of arranged planetary gears is the number-of-teeth difference. In other words, the mechanical paradox planetary gear is a solution when Zd=Zb.

The 3K-I type normal planetary gear mechanism is a mechanism which obtains a high reduction gear ratio similar to the 3K-I type mechanical paradox planetary gear, and works in a similar manner. However, the number of teeth of the sun inner gear is influenced by the difference in number of arranged planetary gears, and therefore, the sun inner gear is inevitably subjected to great profile shifting similar to the 3K-I type mechanical paradox planetary gear.

The problems of the 3K-I type normal planetary gear mechanism are listed as follows.

(1) According to the relationship between the number-of-teeth difference and the number of arranged planetary gears, the number of arranged planetary gears results in being small, and similar to the mechanical paradox planetary gear, the transmittable torque is small.

(2) A high shift coefficient is inevitably required as in the case of the mechanical paradox planetary gear, and therefore, the slip factor is high, and a gear mechanism with high efficiency cannot be realized.

(3) Due to the constraint of the number of arranged planetary gears, there is a limit to increasing the reduction gear ratio.

(4) A force of the planetary gear to fall down in the circumferential direction of the sun outer gear is caused, and a biased stress occurs at both ends of the planetary gear and the sun inner gear, and the ends are concentrically worn.

(5) Originally, there is no sun outer gear which meshes well with the planetary gear (gear D). Therefore, the reaction of rotation of the sun inner gear (gear E) is obtained from meshing between the sun outer gear (gear A), the planetary gear (gear B), and the sun inner gear (gear C) with different axial sections. Therefore, a force to fall down in the circumferential direction of the sun outer gear is mechanically caused. Therefore, mechanically, gear ends are worn more than in the 3K-I type mechanical paradox planetary gear. In other words, the 3K-I type mechanical paradox planetary gear solves this mechanical problem.

(Conventional 3K-II Type)

Next, a conventional technique of the above-described 3K-II type will be described.

Type II is a mechanism to obtain great speed reduction by setting one of the sun outer gears (sun gears) on a fixed axis, the other on a driven axis, and the sun inner gear (ring gear) on a drive axis. That is, this is a mechanism for generating relative rotation between the two sun outer gears by setting the sun inner gear as a rotation input (drive axis).

FIG. 3 is a skeleton diagram of a 3K-II type mechanical paradox planetary gear mechanism, and FIG. 4 is a skeleton diagram of a 3K-II type normal planetary gear mechanism. As seen in the figures, the conventional technique also realizes a 3K-II type planetary gear mechanism. However, the 3K-II type planetary gear mechanism is rarely used. The reason for this is that the number of teeth of the sun outer gear is smaller than that of the sun inner gear, so that in the 3K-II type planetary gear mechanism with different gear ratios there is a greater profile shift in comparison with the 3K-I type, and such conventional problems are more clearly evident, and this is more disadvantageous in comparison with the 3K-I type.

<3K-II Type Mechanical Paradox Planetary Gear Mechanism>

As shown in FIG. 3, the 3K-II type mechanical paradox planetary gear mechanism includes two sun outer gears A and D which can rotate relative to each other, a planetary gear B, and a sun inner gear C. Among the three fundamental axes of a drive axis, a driven axis, and a fixed axis, the drive axis is assigned to the sun inner gear C, and the driven axis and the fixed axis are assigned to the sun outer gears A and D. The planetary gear B meshes with the two sun outer gears A and D with different numbers of teeth, and meshes with the sun inner gear C. Therefore, rotation inputted to the sun inner gear C causes relative rotation with a reduced speed between the gears A and D by fixing either the gear A or the gear D with respect to the rotation of the sun inner gear C.

In the 3K-II type mechanical paradox planetary gear mechanism, the number of arranged planetary gears is small and the transmittable torque is small. The number-of-teeth difference and the number of arranged planetary gears are equal to each other, and the planetary gears mesh with the sun outer gears and the sun inner gear with exactly the same phase relationship and cannot smoothly transmit the rotation, so that it has the same problems as in the 3K-I type mechanical paradox planetary gear mechanism.

<3K-II Type Normal Planetary Gear Mechanism>

As shown in FIG. 4, the 3K-II type normal planetary gear mechanism includes, in addition to the normal planetary gear mechanism of a pair of sun outer gears A, a planetary gear B, and a sun inner gear C, another planetary gear E which shares an axis with the planetary gear B and a sun outer gear E which meshes with this planetary gear E.

Therefore, rotation inputted to the sun inner gear C causes relative rotation with a reduced speed between the gear A and the gear D by fixing either the gear A or the gear D with respect to the rotation of the sun inner gear C, and the movement thereof is exactly the same as that of the 3K-II type mechanical paradox planetary gear mechanism.

It is considered that the 3K-II type normal planetary gear mechanism has problems common to the 3K-II type mechanical paradox planetary gear mechanism and the 3K-I type normal planetary gear mechanism. For example, similar to the mechanical paradox planetary gear, the number of arranged planetary gears is small, the transmittable torque is small, and a gear mechanism with high efficiency cannot be realized.

In addition, there is no sun inner gear that meshes with one planetary gear E, so that similar to the 3K-I type normal planetary gear mechanism, a force of the planetary gear E to fall down is mechanically caused, and gear ends are more easily concentrically worn than in the mechanical paradox planetary gear.

The above-described problems of the conventional 3K type planetary gear mechanisms are caused by mechanical factors of the planetary gears, and therefore, these cannot be fundamentally solved by changing the specifications such as the tooth profile or the number of teeth. Therefore, to solve the problems, looking back on gear reduction theory as the root of the reduction gear mechanisms, the only solution is that a novel gear mechanism mechanically different from the conventional technique be developed.

In consideration of these circumstances, the present invention provides a planetary gear device including a novel planetary gear mechanism which can solve the problems of the conventional devices.

Means for Solving the Problems

Looking back on the theory of the mechanical paradox gear mechanism, the present invention proposes a novel planetary gear mechanism, not a mechanical paradox gear mechanism. In a mechanical paradox planetary gear, two gears with different numbers of teeth attached to one axis mesh with another common gear, however, in the present invention, not one gear but gears with different numbers of teeth formed integrally are provided on a planetary gear axis, and for the two planetary gears, a plurality of gears with different gear ratios are provided as the sun outer gear or the sun inner gear.

The planetary gear device of the present invention works similar to the mechanical paradox planetary gear mechanism, however, in comparison with the mechanical paradox planetary gear, the degree of freedom in reduction gear ratio increases in design, and as a result, the number of arranged planetary gears can be increased, a high torque can be transmitted, a higher reduction gear ratio is realized, and high efficiency is realized.

To solve the above-described problems, the present invention provides a planetary gear device constituted as follows.

The planetary gear device is equipped with a 3K type planetary gear mechanism which includes a sun outer gear, a sun inner gear, and a planetary gear, two of three fundamental axes of a drive axis, a driven axis, and a fixed axis are assigned to either the sun outer gear or the sun inner gear, and the other one fundamental axis is assigned to the other of the sun outer gear or the sun inner gear, and increases and reduces speed by rotation transmission. The planetary gears include at least two first and second gears with different numbers of teeth coaxially and integrally. The one of the sun outer gear and the sun inner gear to which two of the fundamental axes are assigned includes at least two third and fourth gears which mesh with the first and second gears of the planetary gear, respectively, and can rotate relative to each other. The gear ratio of the first gear and the third gear is different from that of the second gear and the fourth gear. The other of the sun outer gear and the sun inner gear to which one of the fundamental axis is assigned includes at least two fifth and sixth gears coaxially and integrally which mesh with the first and second gears of the planetary gear, respectively. The gear ratio of the first gear and the fifth gear is equal to that of the second gear and the sixth gear.

In the above-described constitution, the planetary gear including first and second gears coaxially and integrally and the other of the sun outer gear and the sun inner gear including the fifth and sixth gears coaxially and integrally can rotate relative to each other since the gear ratio of the first gear and the fifth gear that mesh with each other and the gear ratio of the second gear and the sixth gear that mesh with each other are equal to each other.

In the above-described constitution, the third and fourth gears rotatable relative to each other of either one of the sun outer gear and the sun inner gear mesh with the first and second gear that the planetary gear includes coaxially and integrally. The gear ratio of the first gear and the third gear to mesh with each other and the gear ratio of the second gear and the fourth gear to mesh with each other are different from each other, so that the rotation amount of the third gear and the rotation amount of the fourth gear are different from each other with respect to the rotations of the first and second gears of the planetary gear.

For example, when the other of the sun outer gear and the sun inner gear including the fifth and sixth gears coaxially and integrally are fixed, the first gear and the second gear are different in the number of teeth from each other, so that by making small the difference between the gear ratio of the first gear and the third gear and the gear ratio of the second gear and the fourth gear, a great reduction gear ratio can be obtained between the third gear and the fourth gear.

As a preferred embodiment, two of the three fundamental axes of the drive axis, the driven axis, and the fixed axis are assigned to the sun outer gear, and the other one of the fundamental axes is assigned to the sun inner gear.

As another preferred embodiment, two of the three fundamental axes of the drive axis, the driven axis, and the fixed axis are assigned to the sun inner gear, and the other one of the fundamental axes is assigned to the sun outer gears.

Preferably, the planetary gear includes a plurality of gears in different mesh phases with the sun outer gear and the sun inner gear, and are arranged at equiangular intervals.

With the above-described constitution, a high torque can be transmitted.

Preferably, the first and second gears of the planetary gear have central distances equal to each other and mesh with the sun outer gears and the sun inner gears.

With the above-described constitution, the planetary gear is arranged in parallel to the axis of the sun outer gear and the sun inner gear and rotation transmission is enabled.

Preferably, the meshing pitch circle between the first gear and the fifth gear and the meshing pitch circle between the second gear and the sixth gear which are equal in gear ratio to each other are equal to each other. The pitch circle between the first gear and the third gear and the pitch circle between the second gear and the fourth gear which are different in gear ratio from each other are different from each other.

In the conventional devices, to equalize the meshing pitch circles in the case where the gear ratios are different from each other, profile shifting is applied, however, this is unreasonable. With the above-described constitution, unreasonable profile shifting is unnecessary when the gear ratios are different from each other.

Preferably, when the number of teeth of the sun inner gear is different from the sum of two times the number of teeth of the planetary gear and the number of teeth of the sun outer gear, at least one of the sun inner gear, the planetary gear, and the sun outer gear is subjected to profile shifting.

With the above-described constitution, rotation transmission of the planetary gear device is enabled.

Preferably, the planetary gears are arranged at equiangular intervals around the sun gears, and the number of planetary gears and the number of teeth of the planetary gear are relatively prime numbers (that is, has no other common divisor nothing than 1).

With the above-described constitution, the mesh phases of the planetary gears can be made all different from each other.

Preferably, between the sun outer gear and the sun inner gear, a rotation bearing mechanism is provided.

With the above-descried constitution, the planetary gear mechanism can be downsized.

Preferably, the planetary gear includes at least one seventh gear different from the first and second gears, coaxially and integrally. In at least either one of the sun outer gear and the sun inner gear, an eighth gear which meshes with the seventh gear is formed.

With the above-described constitution, gear meshes overlap each other, and a more smooth rotation transmission is realized.

Preferably, the planetary gear includes at least one gear different from the first and second gears, coaxially and integrally. One or more of the three or more gears coaxial and integral with each other included in the planetary gear are screw gears, and the screw gears mesh with at least one or both of the sun outer gear and the sun inner gear.

With the above-described constitution, the screw gear which extends helically axially and meshes at a plurality of positions cancel the axial force. Therefore, the bearing that receives the axial force is unnecessary, so that a compact device can be designed.

Preferably, when the numbers of teeth of the first through fourth gears are defined as Z1 through Z4, and the imaginary numbers of teeth increased or reduced from the numbers Z3 and Z4 of teeth of the third and fourth gears are defined as Z3' and Z4', the following are satisfied:

(a) Z1:Z3'=Z2:Z4',
(b) |Z3-Z3'|=1 or 2, and
(c) |Z4-Z4'|=1 or 2

With the above-described constitution, both of the numbers of teeth Z3 and Z4 of the third and fourth gears are both increased or reduced more than the numbers of teeth Z3' and Z4' whose gear ratios to the first and second gears are equal to each other. By thus increasing or reducing both of the numbers Z3 and Z4 of teeth of the third and fourth gears, a reduction gear ratio higher than in the case where only one of the numbers Z3 and Z4 of teeth of the third and fourth gears is increased or reduced more than the number of teeth Z3' or Z4' whose gear ratios to the first and second gears are equal to each other, is obtained.

By setting the numbers of teeth to be increased or reduced |Z3-Z3'| and |Z4-Z4'| to 1 or 2, the gearshift amount can be made small.

Therefore, the reduction gear ratio can be increased while the shift is minimized.

The first gear and the second gear, the third gear and the fourth gear, and the fifth gear and the sixth gear are helical gears being helical in directions opposite to each other.

With the above-described constitution, the axial position of the planetary gear can be easily maintained constantly. In addition, by omitting the thrust bearing and by downsizing, the constitution can be made simple.

Effects Of The Invention

The planetary gear device of the present invention includes a novel planetary gear mechanism, and solves the problems of the conventional devices. Specifically, the degree of freedom in reduction gear ratio is increased in design, and as a result, the number of planetary gears can be increased, a high torque can be transmitted, a higher reduction gear ratio is realized, and high efficiency is realized.

Figure 1:
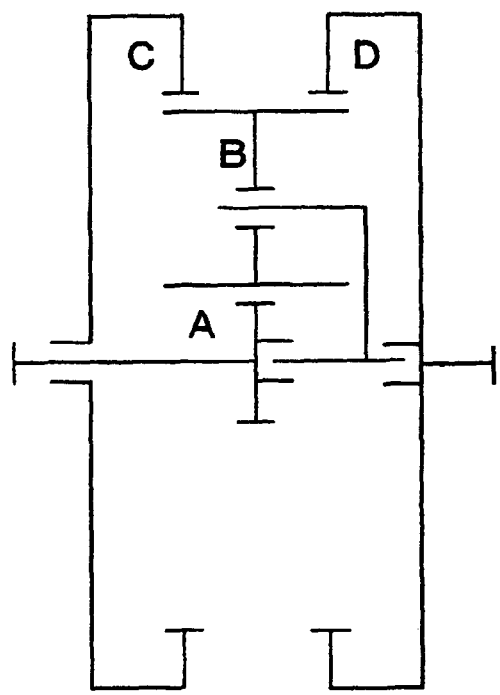
FIG. 1 is a skeleton diagram of a 3K-I type mechanical paradox planetary gear mechanism (conventional example)
Figure 2:
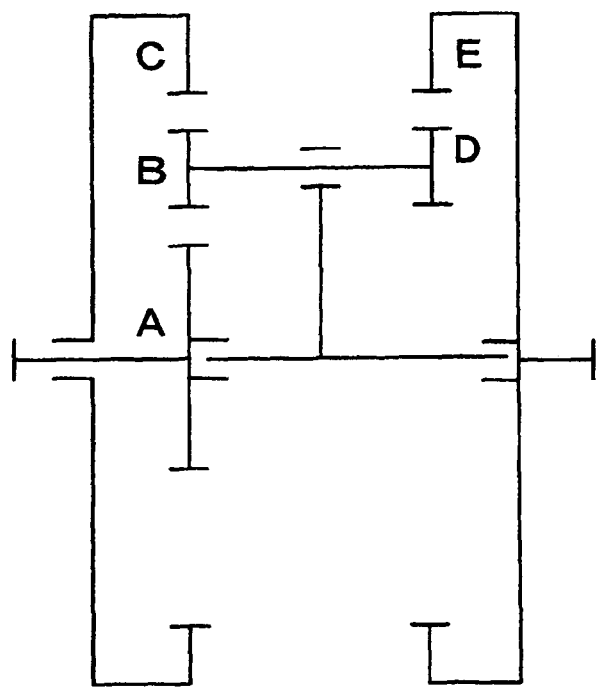
FIG. 2 is a skeleton diagram of a 3K-I type normal planetary gear mechanism (conventional example)
Figure 3:
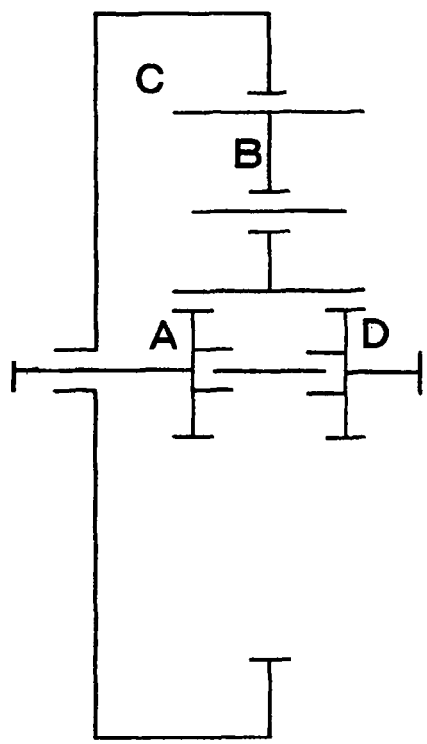
FIG. 3 is a skeleton diagram of a 3K-II type mechanical paradox planetary gear mechanism (conventional example)

DESCRIPTION OF THE REFERENCE NUMERALS 30, 30a, 30b, 30x: planetary gear device
32, 32x: sun outer gear
34, 34x: planetary gear
36, 36x: sun inner gear
38, 38x: sun inner gear
70: planetary gear device
72, 73: sun outer gear
74: planetary gear
76: sun inner gear

BEST MODE FOR CARRYING OUT THE INVENTION

Hereinafter, embodiments of the present invention will be described with reference to FIG. 5 through FIG. 13.

<Novel 3K-I Type Planetary Gear Mechanism of the Present Invention>

First, a novel 3K-I type planetary gear mechanism of the present invention as a first embodiment of the present invention will be described with reference to FIG. 5 through FIG. 10.

Originally, it is understood that the 3K-I type planetary gear mechanism is established not by a number-of-teeth difference as in the case of the conventional technique, but is established as a planetary gear mechanism including two sets of sun outer gears, planetary gears, and sun inner gears which share a planetary axis V, and by a gear ratio difference with respect to the planetary gear, a rotation reduction gear ratio difference is caused.

By considering the novel 3K-I type planetary gear mechanism of the present invention as a combination of two planetary gear mechanisms at different axial positions, the operations thereof will be easily understood.

Figure 5:
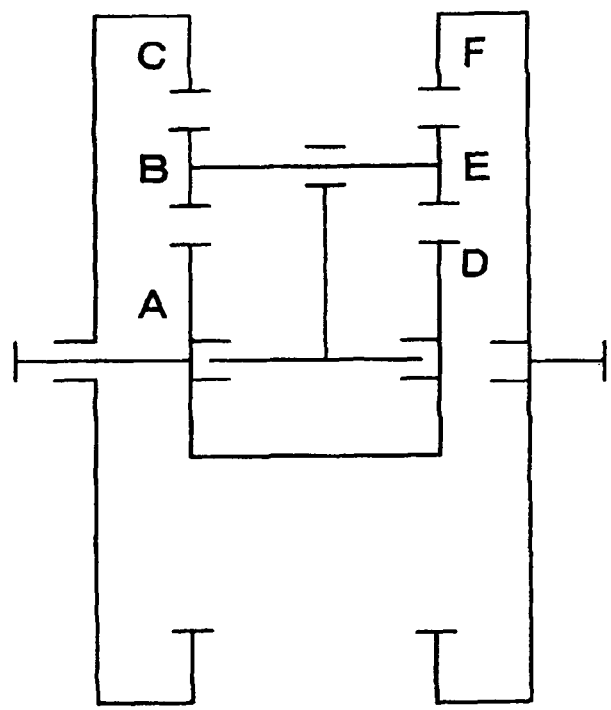
FIG. 5 is a skeleton diagram of a 3K-I type planetary gear mechanism (Example 1)

FIG. 5 is a skeleton diagram of the novel 3K-I planetary gear mechanism of the present invention. One planetary gear mechanism includes a sun outer gear A, a planetary gear B, and a sun inner gear C. Another planetary gear mechanism includes a sun outer gear D, a planetary gear E, and a sun inner gear F. For example, the gears B and E correspond to the "first and second gears" described in the claims, the gears C and F correspond to the "third and fourth gears," and the gears A and D correspond to the "fifth and sixth gears." The numbers of teeth of the gears A, B, C, D, E, and F are defined as Za, Zb, Zc, Zd, Ze, and Zf.

The gear A and the gear D share an axis, and the gear B and the gear E share an axis. The gear A and the gear B mesh with each other, and the gear D and the gear E mesh with each other. To transmit the same rotation between the gear A and the gear B and between the gear D and the gear E, the gear ratios of two pairs of gears A and B and D and E to mesh with each other must be equal to each other, so that the following is satisfied:

$$Za/Zb = Zd/Ze$$

To rotate the gear C and the gear F relative to each other and make the rotations different with respect to the planetary gears B and E, the following must be satisfied:

$$Zc/Zb \neq Zf/Ze$$

Therefore, when FIG. 5 is regarded as one planetary gear mechanism, the sun outer gear and the planetary gear include two pairs of gears (A, D and B, E) whose gear ratios are equal to each other, and on the other hand, the planetary gear and the sun inner gear include two pairs of gears (B, E and C, F) whose gear ratios are different from each other.

This mechanism structurally has mechanical constraints, and therefore, the following are said to be true.

(1) The gear mechanism has central distances all equal to each other, and meshing pitch circles are equal to each other between two pairs of sun outer gears and planetary gears whose gear ratios are equal to each other, and are not equal to each other between two pairs of sun outer gears and planetary gears whose gear ratios are different from each other. The sun inner gears whose gear ratios are different from each other inevitably have different reference pitch circles.

(2) In the 3K-I planetary gear mechanism, the gear ratios of the two pairs are equal to each other between the pairs of the sun outer gears and the planetary gears, and different from each other between the pairs of the sun inner gears and the planetary gears (the numbers of teeth of sun outer gears/the numbers of teeth of planetary gears are equal to each other, and the numbers of teeth of sun inner gears/the numbers of teeth of planetary gears are different from each other).

(3) The number of planetary gears to be arranged is a divisor of the sum of the sun outer gears and the sun inner gears, and the number of meshes of the two planetary gear mechanisms is a common divisor of the divisors of the sums of the sun outer gears and the sun inner gears since axes of the pair of planetary gears are common, and the larger the number of arranged planetary gears, the smaller the size and the higher the transmittable torque.

(4) As the difference in speed ratio of the two pairs of sun inner gears with respect to the planetary gears becomes smaller, the reduction gear ratio becomes higher, and gear wearing is smaller, so that a gear mechanism with excellent durability can be obtained.

(5) The gear mechanism with a smaller shift coefficient has a smaller slip factor, so that the efficiency is excellent.

To establish a gear mechanism with a higher reduction gear ratio, excellent durability and load bearing in consideration of (1) through (4) described above, by reducing the gear ratio difference of the meshes of the two gear mechanisms, the force to fall down in the circumferential direction of the sun outer gears is made smaller, and a gear combination with a smaller shift coefficient is realized, and a planetary gear arrangement method which increases the number of arranged planetary gears and a method for setting the numbers of teeth are shown.

Hereinafter, the novel 3K-I type planetary gear mechanism of the present invention will be described, focusing on a planetary arrangement method.

(Reduction Gear Ratio of Novel 3K-I Type Planetary Gear Mechanism of the Present Invention)

First, one set of a planetary gear mechanism 1 consisting of the gears A, B, and C is referred to as a planetary gear mechanism 1, and another set of a planetary gear mechanism consisting of the gears D, E, and F is referred to as a planetary gear mechanism 2, and when the sun outer gears and the sun inner gears are made to rotate by 360 degrees relative to each other, the rotation position relationships of the sun outer gears A and D and the sun inner gears C and F with respect to the planetary gears B and E are as shown in Table 1 below.

TABLE 1

|  | planetary gear mechanism 1 | planetary gear mechanism 2 |
|---|---|---|
| position of sun outer gear | Hs1 = Zc/(Za + Zc) | Hs2 = Zf/(Zd + Zf) |
| position of sun inner gear | Hr1 = Za/(Za + Zc) | Hr2 = Zd/(Zd + Zf) |

The inner gear of the planetary gear mechanism 1 is set on a fixed axis, so that the rotation is applied between the sun outer gear of the planetary gear mechanism 1 and the sun inner gear of the planetary gear mechanism 2. The gear ratios of two pairs of the sun outer gears and the planetary gears are equal to each other, and the planetary gears B and E have only one rotation position with respect to the sun gear A and D. Specifically, the position Hs2 of the sun outer gear of the planetary gear mechanism 2 is fixed to a revolution position of the planetary gear mechanism 1. Therefore, relative rotation by 360 degrees between the sun outer gear and the sun inner gear of the planetary gear mechanism 1 corresponds to rotation of Hs1/Hs2 of the planetary gear mechanism 2, and therefore, the position of the sun inner gear of the planetary gear mechanism 2 is Hr2·Hs1/Hs2.

Therefore, the relative rotation (speed ratio u) of the sun inner gears of the planetary gear mechanism 1 and the planetary gear mechanism 2 is:

$$u = Hr1 - Hr2 \cdot Hs1/Hs2$$

and the reciprocal of this is the reduction gear ratio K satisfying:

$$K = 1/(Hr1 - Hr2 \cdot Hs1/Hs2) \quad (1)$$
$$= (Za + Zc) \cdot Zf / (Za \cdot Zf - Zd \cdot Zc)$$

Conversely, by using this equation, a calculating formula for a mechanical paradox planetary gear is generally derived, and it is proved below that this formula is fundamentally true.

The reduction gear ratio K' of the 3K mechanical paradox planetary gear of a conventional technique shown in FIG. 1 satisfies:

$$K' = (1 + Zd'/Za')/(1 - Zd'/Zc') \quad (1)'$$

provided that the numbers of teeth of the gears A through D shown in FIG. 1 are defined as Za' through Zd', the gear A is set on a drive axis (input), the gear C is set on a driven axis (output), and the gear D is set on a fixed axis.

Equation (1) relating to FIG. 5 is transformed as follows. Specifically, to make correspondent the gears A through F of FIG. 5 to the gears A through D of FIG. 5, the gears of Equation (1) are made correspondent to the gears of FIG. 1. The driven axis is assigned to the gear F in Equation (1), however, in Equation (1)', it is set to the gear C, and the fixed axis is assigned to the gear C in Equation (1), however, in Equation (1)', it is assigned to the gear D, so that by rewriting Za of Equation (1) into Za', Zc into Zd', Zd into Za', and Zf into Zc', Equation (1)' is derived:

$$K = (Za + Zc) \cdot Zf / (Za \cdot Zf - Zd \cdot Zc) \quad (1)$$
$$= (Za' + Zd') \cdot Zc' / (Za' \cdot Zc' - Za' \cdot Zd')$$
$$= (1 + Zd'/Za')/(1 - Zd'/Zc')$$

That is, Equation (1)' is a particular solution when the numbers of teeth of the sun outer gears and the numbers of teeth of the planetary gears of the planetary gear mechanism 1 and the planetary gear mechanism 2 are made equal to each other.

(Principle of Planetary Gear Arrangement Method of Novel 3K-I Type Planetary Gear Mechanism of the Present Invention)

Next, arrangement of planetary gears and the number of arranged planetary gears will be described. The principle of the number of arranged planetary gears is as follows.

(1) The number of arranged planetary gears (N) is a divisor of the sum of the numbers of teeth of the sun outer gear and the sun inner gear. In the novel 3K-I planetary gear mechanism of the present invention in which the planetary gear mechanism 1 and the planetary gear mechanism 2 share the planetary gear axis, the number of arranged planetary gears is a common divisor of the sums of the numbers of teeth of the two sun outer gears and sun inner gears, that is, a common divisor of (Za+Zc) and (Zd+Zf).

(2) When the number of arranged planetary gears is defined as (N) and the common divisor of the sun outer gears and the sun inner gears is defined as q, each N/q sets of arranged planetary gears mesh with the sun outer gears and the sun inner gears in the same phase, and the number of gears with the same phase is q.

Based on this principle, a planetary arrangement method in this planetary gear mechanism will be described in detail while showing detailed numbers of teeth.

(Gear Setting Method 1 in the Planetary Gear Mechanism)

A method for setting the following numbers of teeth and the number of arranged planetary gears will be described.
Planetary gear mechanism 1: Za=27, Zb=9, Zc=45
Planetary gear mechanism 2: Zd=30, Ze=10, and Zf=51
Number of arranged planetary gears: 9

(Planetary Gear Mechanism 1)

(1) When the number of teeth of the sun inner gear is the sum of two times the numbers of teeth of the sun outer gear and the planetary gear, the sun inner gear can be meshed with the gears without shifting. That is, the meshing pitch circle and the reference pitch circle can be made equal to each other. In the planetary gear mechanism 1, Zc=Za+2·Zb is satisfied, and the meshing pitch circle and the reference pitch circle can be made equal to each other.

(2) When the number of teeth of the planetary gear and the number of arranged planetary gears are equal to each other, necessarily, the numbers of teeth of the sun outer gear and the sun inner gear have a divisor equal to the number of arranged planetary gears. Therefore, all planetary gears mesh with the sun outer gear and the sun inner gear in the same phase. Similarly, when the number of teeth of the planetary gear is large and the meshing pitch circle and the reference pitch circle are equal to each other, the gears mesh with each other in the same phase.

(3) $Za/Zb=3$ and $Zc/Zb=5$, so that the number of teeth of the planetary gear is a divisor of the number of teeth of the sun outer gear and the number of teeth of the sun inner gear, and the gears mesh with each other while all arranged planetary gears have the same phase.

(4) The sum ($Za+Zc$) of the number of teeth of the sun inner gear and the number of teeth of the sun outer gear is $8 \cdot Zb$. Specifically, when $Zc=Za+2 \cdot Zb$ is satisfied, the number of arranged planetary gears is a divisor of a value ($8 \cdot 2b$) obtained by multiplying the sum ($Za/Zb+Zc/Zb$) of ratios of the number of teeth of the sun inner gear and the number of teeth of the sun outer gear to the number of teeth of the planetary gear by the number of teeth of the planetary gear, that is, a divisor of $(Za/Zb+Zc/Zb) \cdot Zb$.

Therefore, the number of arranged planetary gears can be set to 8, that is, $(Za/Zb+Zc/Zb)$ can be used as the number of arranged planetary gears, and in this case, the shift coefficient of the meshing of the sun inner gear of another planetary gear mechanism 2 inevitably increases, and in actuality, the gears cannot be combined. In addition, the difference in gear ratio (the number of teeth of the sun inner gear/the number of teeth of planetary gear) between the two planetary gear mechanisms is increased, the reduction gear ratio becomes smaller, and the advantage of this novel 3K-I type planetary gear mechanism cannot be obtained.

Specifically, the planetary arrangement and number-of-teeth setting method of this example in which a combination of the numbers of teeth to make equal the meshing pitch circle and the reference pitch circle to each other is used, the number of arranged planetary gears is set to be equal to the number of teeth of the planetary gear, and the number of arranged planetary gears is not equal to $Za/Zb+Zc/Zb$ is defined as an arrangement method I.

$Zc=Za+2 \cdot Zb$ $N \neq Za/Zb+Zc/Zb$ $N=Zb$ (Planetary Gear Mechanism 2)

(1) The gear ratio of the sun outer gear to the planetary gear (the number of teeth of the sun outer gear/the number of teeth of the planetary gear) is equal to that of the planetary gear mechanism 1, and the gear ratio of the sun inner gear to the planetary gear (the number of teeth of the sun inner gear/the number of teeth of the planetary gear) is different from that of the planetary gear mechanism 1.

$Zf \neq Ze \cdot Zd/Zb$

Therefore, the planetary gear mechanism 2 satisfies:

$Zd \neq Ze+2 \cdot Zf$ $Zd=Ze \cdot Za/Zb$ $Zf \neq Ze \cdot Zd/Zb$ (2) The gear mechanism is not a mechanical paradox planetary gear, so that the number of teeth of the planetary gear is different from that of the planetary gear mechanism 1, and the following is satisfied:

$Zd \neq Zb$ (3) The sum of the numbers of teeth of the sun outer gear and the sun inner gear is the same as in the planetary gear mechanism 1, so that it has a divisor other than 1, equal to the number of arranged planetary gears. That is, $(Zd+Zf)/N=$integer To increase the reduction gear ratio, the following is satisfied:

$Zf \neq Ze \cdot Zd/Zb$ (4) However, to obtain a high reduction gear ratio as the feature of the novel 3K-I type planetary gear mechanism of the present invention and provide the mechanism with durability, it is required that the gear ratio of the sun inner gear to the planetary gear (the number of teeth of the sun inner gear/the number of teeth of the planetary gear) is close to the gear ratio of the sun inner gear to the planetary gear of the planetary gear mechanism 1 as much as possible. That is, $Zf/Zb \approx Zf/Zb$ To make the gear ratio of the sun inner gear to the planetary gear (the number of teeth of the sun inner gear/the number of teeth of the planetary gear) close to that of the planetary gear mechanism 1, in this example, the following method was used.

The number of teeth of the planetary gear of the planetary gear mechanism 2 is set to be slightly larger than the number of teeth ($Zb=9$) of the planetary gear of the planetary gear mechanism 1. ($Zd=10$)

In this case, the gear ratio of the sun inner gear to the planetary gear (the number of teeth of the sun inner gear/the number of teeth of the planetary gear) becomes a number slightly larger than that of the planetary gear mechanism 1.

That is, the number of teeth satisfies the condition of the number of arranged planetary gears and slightly larger than Zb, by selecting Zf satisfying that Zf/Zb is slightly larger than Zd/Zb, a great reduction gear ratio is obtained.

When Zd is slightly smaller than Zb, by selecting Zf satisfying that Zf/Zb is slightly smaller than Zd/Zb, a great reduction gear ratio is obtained.

(5) The number of teeth of the planetary gear is a divisor of the number of teeth (30) of the sun outer gear, however, the three numbers of teeth of the number of arranged planetary gears (9), the number of teeth (30) of the sun outer gear, and the number of teeth (51) of the sun inner gear have a common divisor=3, and therefore, the gears mesh in three phases.

According to the planetary number-of-teeth setting method, in the combination of the numbers of teeth, the meshing pitch circle of the sun inner gear is different from the reference pitch circle, and profile shifting is applied, and the gears mesh in different phases. The number of arranged planetary gears is the same as in another gear mechanism. The planetary arrangement and number-of-teeth setting method of this example is defined as an arrangement method II.

That is, the gear mechanism is set up by combining the arrangement method I and the arrangement method II, the number of arranged planetary gears is large as many as 9, and the reduction gear ratio is extremely great as high as 136.

An example of gear specifications will be described in the following Table 2.

TABLE 2

| type of gear | planetary gear mechanism 1 | | | planetary gear mechanis 2 | | |
| --- | --- | --- | --- | --- | --- | --- |
| | sun outer gear | sun outer gear | sun inner gear | sun outer gear | sun outer gear | sun inner gear |
| number of teeth | 27 | 9 | 45 | 30 | 10 | 51 |
| number of planetary gear | | 9 | | | 9 | |
| module | | 0.556 | | | 0.4878 | |
| pressure agnle | | 30 degree | | | 25 degree | |
| helix angle | | 0 degree | | | 0 degree | |
| pitch circle diameter | 15 | 5 | 25 | 14.6341 | 4.878 | 24.878 |
| tip circle diameter | 15.5 | 5.8 | 24 | 15.5 | 6 | 24.46 |
| root circle diameter | 13.8 | 3.9 | 26 | 13.8 | 4.3 | 26.4 |
| base circle diameter | 12.9904 | 4.3301 | 21.6506 | 13.263 | 4.421 | 22.5472 |
| coefficient of profile shift | 0 | 0 | 0 | 0.1318 | 0.3953 | 0.3953 |
| amount of profile shift | 0 | 0 | 0 | 0.0643 | 0.1928 | 0.1928 |
| center distance | | 10 | | | 10 | |
| transverse operating pressure angle | | 30 | 30 | 27° 50' 47" | | 25° |
| intermeshing pitch circle diameter | 15 | 5    5 | 25 | 15 | 5    4.878 | 24.878 |

Table 2 shows gear specifications when the central distance is set to 10 mm. The numbers of teeth are determined, so that if the central distance is determined, the module is determined. The reference circle is calculated when the pressure angle is determined. Therefore, the meshing pitch circle is calculated when the module and the numbers of teeth, etc., are determined.

The two pairs of the sun outer gears and the planetary gears with gear ratios equal to each other have meshing pitch circles equal to each other, and the two pairs of the sun inner gears and the planetary gears with gear ratios not equal to each other have meshing pitch circles not equal to each other.

In the case of meshing of the planetary gear with gears with pitch circles not equal to each other, the planetary gear meshes with the sun outer gear and the sun inner gear at different tooth height positions.

The shift amount can be divided into the sun outer gear, the planetary gear, and the sun inner gear within the common-sense range in which the gears normally mesh with each other. As shown in this example, gear meshing is realized with a shift coefficient much smaller than that of the gears illustrated in the 3K-I type mechanical paradox planetary gear mechanism. In the 3K-I type mechanical paradox planetary gear mechanism, two sun inner gears mesh with a planetary gear with meshing pitch circles equal to each other, so that a great shift coefficient is necessary, however, in the present invention, profile shifting can be divided into the sun outer gear, the planetary gear, and the sun inner gear, so that the mechanism can be realized with a smaller shift amount.

(Gear Setting Method 2 of Planetary Gear Mechanism)

As another example, a method for setting the following numbers of teeth and number of arranged planetary gears will be described.
Planetary gear mechanism 1: $Za=42$, $Zb=21$, $Zc=86$
Planetary gear mechanism 2: $Zd=50$, $Ze=25$, $Zf=102$
Number of arranged planetary gears: 8 or 4 (8 is possible if the tooth height is small.)

In this example, the planetary arrangement method II is applied to the planetary gear mechanism 1 and the planetary gear mechanism 2. The planetary gears mesh with the sun inner gears and the sun outer gears in two different phases. The mechanisms have a combination of the numbers of teeth in which the meshing pitch circle of the sun inner gear is different from the reference pitch circle, and profile shifting is applied.

The reduction gear ratio is very high as large as 816, and such a high reduction gear ratio cannot be realized with a mechanical paradox planetary gear.

The relationship of the numbers of teeth is shown as follows:

$$Za+2 \cdot Zb < Zc$$

$$Zd+2 \cdot Ze < Zf$$

This example is characterized in that the numbers of teeth Zc and Zf of the two sun inner gears C and F are both increased or reduced in the same direction from the numbers of teeth ($Za+2 \cdot Zb=Zc$, $Zd+2 \cdot Ze=Zf$) which make the meshing pitch circle equal to the reference pitch circle. From this, a greater reduction gear ratio is obtained.

As a matter of course, even when the numbers of teeth Zc and Zf of the sun inner gears C and F are made smaller than the numbers of teeth which make the meshing pitch circle equal to the reference pitch circle, that is, $$Za+2 \cdot Zb > Zb$$

$$Zd+2 \cdot Ze > Zf$$

a great reduction gear ratio is obtained.

This example can be constituted in the same manner as in the gear setting method 1. However, the gears can be arranged so that the meshing phases of the gears A, B, and C and the gears D, E, and F are all different from each other, and according to meshing overlapping, the rotation of the planetary gear is continuously transmitted, and smooth rotation transmission is realized.

(Difference from the Conventional Technique and Essential Superiority to the Conventional Technique of the Novel 3K-I Type Planetary Gear Mechanism)

The novel 3K-I type planetary gear mechanism of the present invention is a gear mechanism including two sets of sun outer gears, planetary gears, and sun inner gears, and as the relationship between two pairs of the sun outer gears and the planetary gears, the gear ratios are equal to each other and the numbers of teeth are different from each other, and as the relationship between two pairs of the sun inner gears and the planetary gears, the gear ratios are different from each other. Therefore, this is different from a 3K-I mechanical paradox planetary gear.

The number of arranged planetary gears is a common divisor other than 1 of the sums of two pairs of the sun outer gears and the sun inner gears. The number of arranged planetary gears can be set without depending on the number-of-tooth difference, the number of arranged planetary gears is large, and great torque transmission can be realized with a small size. Under a constraint of a common number of arranged planetary gears, in the relationship between two pairs of sun inner gears and planetary gears, when the gear ratio difference is set to be small, a high reduction gear ratio is realized, and excellent durability is obtained.

In at least one of the two sets, the planetary gear can be meshed with the sun outer gear and the sun inner gear in different phases. Therefore, rotation is continuously transmitted, and a locked state that is the problem of the mechanical paradox planetary gear can be avoided.

(Selection of Numbers of Teeth)

The method for selecting the numbers of teeth will be further described with reference to the following Table 3.

TABLE 3

| No. | Zs | Zp | Zs + 2Zp | 2(Zs + Zp) | 2(Zs + Zp) + 1 | 2(Zs + Zp) − 1 |
|---|---|---|---|---|---|---|
| 1 | 20 | 10 | 40 | 60 | 61 | 59 |
| 2 | 22 | 11 | 44 | 66 | 67 | 65 |
| 3 | 24 | 12 | 48 | 72 | 73 | 71 |
| 4 | 26 | 13 | 52 | 78 | 79 | 77 |
| 5 | 28 | 14 | 56 | 84 | 85 | 83 |
| 6 | 30 | 15 | 60 | 90 | 91 | 89 |
| 7 | 32 | 16 | 64 | 96 | 97 | 95 |
| 8 | 34 | 17 | 68 | 102 | 103 | 101 |
| 9 | 36 | 18 | 72 | 108 | 109 | 107 |
| 10 | 38 | 19 | 76 | 114 | 115 | 113 |
| 11 | 40 | 20 | 80 | 120 | 121 | 119 |
| 12 | 42 | 21 | 84 | 126 | 127 | 125 |
| 13 | 44 | 22 | 88 | 132 | 133 | 131 |
| 14 | 46 | 23 | 92 | 138 | 139 | 137 |
| 15 | 48 | 24 | 96 | 144 | 145 | 143 |
| 16 | 50 | 25 | 100 | 150 | 151 | 149 |
| 17 | 52 | 26 | 104 | 156 | 157 | 155 |
| 18 | 54 | 27 | 108 | 162 | 163 | 161 |
| 19 | 56 | 28 | 112 | 168 | 169 | 167 |
| 20 | 58 | 29 | 116 | 174 | 175 | 173 |

Table 3 shows the case where the gear ratio of the sun outer gear, the planetary gear, and the sun inner gear is 2:1:4. When the number of teeth of the sun outer gear is defined as Zs and the number of teeth of the planetary gear is defined as Zp, to arrange these gears coaxially, the number of teeth of the sun inner gear is Zs+2Zp. The number of arranged planetary gears is generally a divisor of the sum 2 (Zs+Zp) of the number of teeth of the sun outer gear and the number of teeth of the sun inner gear.

For example, to reduce the number of arranged planetary gears by 5 and reduce the number of teeth by 1, a combination satisfying that 2 (Zs+Zp)−1 is divisible by 5, for example, No. 2 and No. 7 are selected. Then, the numbers of teeth of the sun inner gears or the sun outer gears are subtracted by 1 from the numbers of No. 2 and No. 7.

In detail, in the case of a 3K-I type planetary gear mechanism, by reducing the numbers of teeth of the sun inner gears, the numbers of teeth of one set of the sun outer gear, the planetary gear, and the sun inner gear corresponding to No. 2 are set to 22, 11, and 43, and the numbers of teeth of the other set of the sun outer gear, the planetary gear, and the sun inner gear corresponding to No. 7 are set to 32, 16, and 63. In the case of a 3K-II type planetary gear mechanism, by reducing the numbers of teeth of the sun outer gears, the numbers of teeth of one set of the sun outer gear, the planetary gear, and the sun inner gear corresponding to No. 2 are set to 21, 11, and 44, and the numbers of teeth of the other set of the sun outer gear, the planetary gear, and the sun inner gear corresponding to No. 7 are set to 31, 16, and 64.

For example, when No. 2 and No. 17 are selected, the numbers of teeth of the sun inner gears or the sun outer gears may be reduced by 2 from the number of No. 2 and reduced by 1 from the number of No. 17. When the two gears are different by twice in number of teeth from each other, in some cases where one is reduced by 2 and the other is reduced by 1, the reduction gear ratio can be increased more than in the case where both are reduced by 1.

As another example, when the number of arranged planetary gears is increased by 7 and the number of teeth is increased by 1, a combination satisfying that 2 (Zs+Zp)+1 is divisible by 7, for example, No. 6 and No. 13 are selected. Then, the numbers of teeth of the sun inner gears or sun outer gears are increased by 1 from the numbers of No. 6 and No. 13.

In detail, in the case of a 3K-I type planetary gear mechanism, by increasing the numbers of teeth of the sun inner gears, the numbers of teeth of the sun outer gear, the planetary gear, and the sun inner gear of one set corresponding to No. 6 are set to 30, 15, and 61, and the numbers of teeth of the sun outer gear, the planetary gear, and the sun inner gear of the other set corresponding to No. 13 are set to 44, 22, and 89. In the case of a 3K-II planetary gear mechanism, by increasing the numbers of teeth of the sun outer gears, the numbers of teeth of the sun outer gear, the planetary gear, and the sun inner gear of one set corresponding to No. 6 are set to 31, 15, and 60, and the numbers of teeth of the sun outer gear, the planetary gear, and the sun inner gear of the other set corresponding to No. 13 are set to 45, 22, and 88.

When No. 6 and No. 20 are selected, the numbers of teeth of the sun inner gears or sun outer gears may be increased by 2 from the number of No. 6 and increased by 1 from the number of No. 20. When these two are different in number of teeth by twice from each other, in some cases where one is increased by 2 and the other is increased by 1, the reduction gear ratio can be increased more in comparison with the case where both are increased by 1.

EXAMPLE 1

Figure 6A:
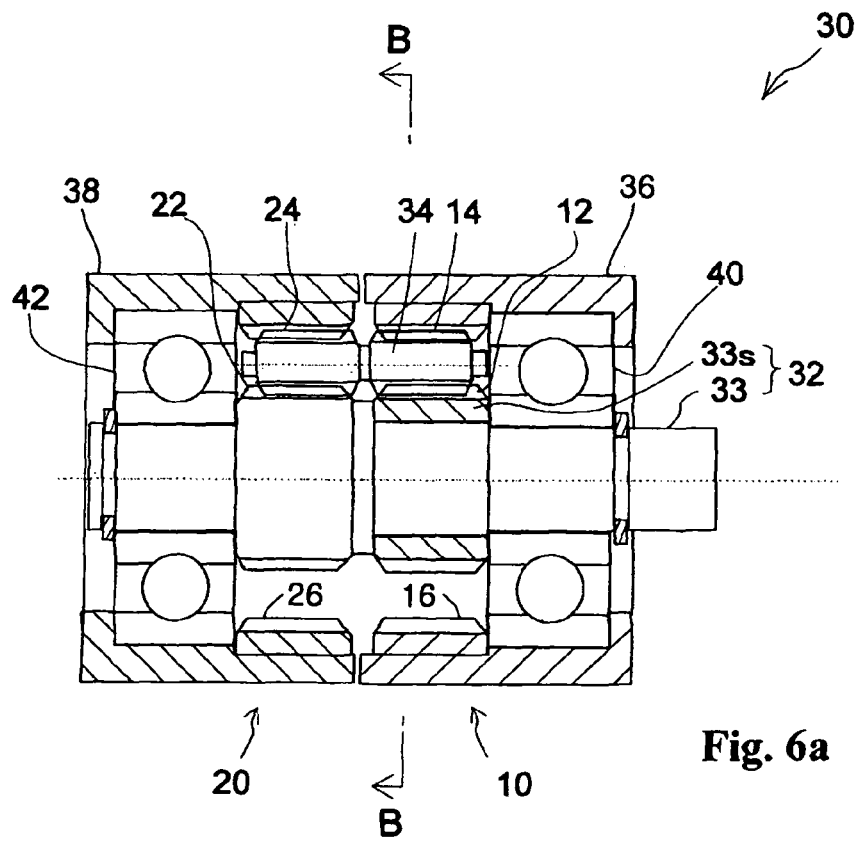
FIG. 6a is a sectional view of the 3K-I type planetary gear mechanism (Example 1)
Figure 6B:
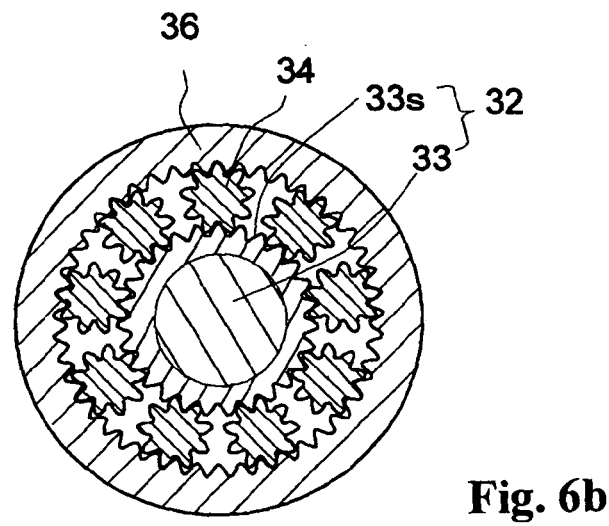
FIG. 6b is a sectional view of the 3K-I type planetary gear mechanism (Example 1)

Next, a detailed constitution of the novel 3K-I type planetary gear mechanism of the present invention will be described with reference to FIG. 6a and FIG. 6b. FIG. 6a is a sectional view showing a constitution of a planetary gear device 30, and FIG. 6b is a sectional view along the line B-B of FIG. 6a.

The planetary gear device 30 includes a sun outer gear 32, a plurality of planetary gears 34, and two sun inner gears 36 and 38, and the planetary gears 34 are arranged in a ring-shaped space between the sun outer gear 32 and the sun inner gears 36 and 38.

In the sun outer gear 32 and the planetary gear 34, two pairs of gears 12, 22 and 14, 24 which mesh with each other are formed, respectively. On one sun inner gear 36, a gear 16 which meshes with one gear 14 of the planetary gear 34 is formed. On the other sun inner gear 38, a gear 26 which meshes with the other gear 24 of the planetary gear 34 is formed. The gears 12, 14, 16, 22, 24, and 26 of FIG. 6 correspond to the gears A, B, C, D, E, F, and G of FIG. 5.

One planetary gear mechanism 10 consists of the gear 12 of the sun outer gear 32, the gear 14 of the planetary gear 34, and the gear 16 of the sun inner gear 36, and another planetary gear mechanism 20 consists of the gear 22 of the sun outer gear 32, the gear 24 of the planetary gear 34, and the gear 26 of the sun inner gear 36. Between the two planetary gear mechanisms 10 and 20, the gears 12 and 22 of the sun outer gear 32 and the gears 14 and 24 of the planetary gear 34 have gear ratios equal to each other and numbers of teeth different from each other. The gears 16 and 26 of the sun inner gears 36 and 38 and the gears 14 and 24 of the planetary gear 34 have gear ratios different from each other.

The sun outer gear 32, the planetary gear 34, and the sun inner gears 36 and 38 can be manufactured by integral machining and combination of a plurality of members. For example, the sun outer gear 32 is manufactured by a member 33s on which the other gear 12 is formed is press-fitted with an axis main body 33 on which one gear 22 is formed.

Between the sun outer gear 32 and the two sun inner gears 36 and 38, bearings 40 and 42 are disposed. The bearings 40 and 42 are disposed on both sides of the planetary gear 34. A carrier is not always necessary for the planetary gear 34, however, it is allowed that a carrier is provided so as to support the planetary gear 34 rotatably.

While fixing (binding) one of the sun outer gear 32 and two sun inner gears 36 and 38, the planetary gear mechanism 30 can transmit rotation between the other two gears. For example, the sun outer gear 32 is driven, either one of the two sun inner gears 36 and 38 is fixed, and rotation of the other one is taken out. In this case, when driving is started from one gear 12 side of the sun outer gear 32, to suppress a twisting stress, it is preferable that the sun inner gear 36 on the driving side is fixed and the other sun inner gear 38 is rotated.

Next, operations of the planetary gear device 30 will be described.

In one planetary mechanism 10 consisting of the gear 12 of the sun outer gear 32, the gear 14 of the planetary gear 34, and the gear 16 of the sun inner gear 36, when the sun outer gear 32 rotates, the gear 12 of the sun outer gear 32 rotates. When the sun inner gear 36 is fixed, the gear 16 of the sun inner gear 36 is fixed, so that the gear 14 of the planetary gear 34 revolves around the gear 16 of the sun inner gear 36 while rotating on its own axis. The gear ratios of the gears 12 and 22 of the sun outer gear 32 and the gears 14 and 24 of the planetary gear 34 are equal to each other, so that the gears 12 and 22 of the sun outer gear 32 and the gears 14 and 24 of the planetary gear 34 rotate integrally, and the gear 24 of the planetary gear 34 revolves around the gear 12 of the sun outer gear 32 while rotating on its own axis.

On the other hand, the gear ratios of the gears 16 and 26 of the sun inner gears 36 and 38 and the gears 14 and 24 of the planetary gear 34 are different from each other, so that when the gear 24 of the planetary gear 34 revolves around the gear 22 of the sun outer gear 32 while rotating on its own axis, the gear 26 of the sun inner gear 38 which meshes with the gear 24 of the planetary gear 34 rotates. That is, the sun inner gear 38 rotates.

Specifically, when the sun inner gear 36 is fixed, rotation can be transmitted between the sun outer gear 32 and the sun inner gear 38. The numbers of teeth of the gears 14 and 24 of the planetary gear 34 are different from each other, so that a high reduction gear ratio can be obtained.

Next, Variations 1 and 2 of the novel 3K-I type planetary gear mechanism of the present invention will be described with reference to FIG. 7 through FIG. 10. Hereinafter, differences from Example 1 will be mainly described, and for the same components as in Example 1, the same reference numerals are used.

(Variation 1)

Variation 1 will be described with reference to FIG. 7 and FIG. 8.

In Variation 1, to the novel 3K-I type planetary gear mechanism of the present invention, another gear set which shares an axis with the gears, has the same gear ratio and different numbers of teeth are added in parallel.

Figure 7:
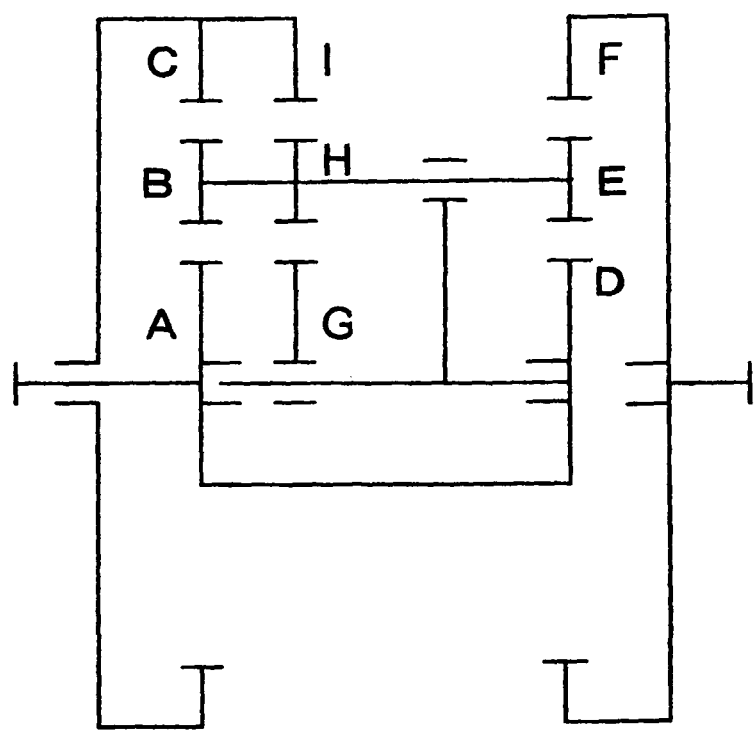
FIG. 7 is a skeleton diagram of a 3K-I type planetary gear mechanism (Variation 1)

As shown in the skeleton diagram of FIG. 7, the screw gears G, H, and I are arranged in parallel to the gears A, B, and C with the same gear ratio. By using the screw gears G, H, and I, rotation can be transmitted in the state that the axial positions of the planetary gears are fixed.

The effect of addition of a gear set with different numbers of teeth can be summarized as follows.

(1) By adding meshing of different numbers of teeth, meshes of the gears overlap, and a more smooth rotation transmission is realized.

(2) By using screw gears as the gears added in parallel, an axial load which cannot be received by a normal rotation transmission mechanism can be received.

(3) In the planetary gear, many bearings are necessary, however, by adding the screw gears, the bearing mechanism becomes unnecessary and a compact design can be made.

By using screw gears with the same gear ratio, the sun outer gear, the planetary gear, and the sun inner gear can rotate with the same speed ratio. For example, when the numbers of teeth of the sun outer gear A, the planetary gear B, and the sun inner gear C of the planetary gear mechanism 1 are Za=27, Zb=9, and Zc=45, and a ratio of these is 3:1:5, as the screw gears H, I, and J of the sun outer gear, the planetary gear, the sun inner gear, gears with three threads, one thread, and five threads, that is, 3-teeth, 1-tooth, and 5-teeth helical gears with small lead angles are used so as to rotate integrally with the sun outer gear A, the planetary gear B, and the sun inner gear C. Accordingly, the speed ratios are the same, so that rotation transmission is performed while compensating the meshing, and axial movement does not occur. In other words, if axial movement occurs, meshing phases are not obtained, so that axial movement is prohibited. Therefore, even if a load is applied axially, the rotation is not transmitted in the orthogonal rotation direction, and the tooth flanks of the screw gears receive the load.

Therefore, the sun outer gear A, the planetary gear B, and the sun inner gear C are rotatable radially, and fixed so as not to be displaced axially. The sun outer gear A and the sun outer gear D and the planetary gear B and the planetary gear E are integrated with each other. Therefore, only the sun inner gear F is not fixed in the axial direction with respect to the gears A, B, C, D, and E. Therefore, by fixing the sun inner gear F and the sun outer gears A and D which can be displaced axially by a bearing so as to rotate and be restricted from being displaced axially, in this mechanism, all gears are rotatable and are restricted from being displaced by an axial load, so that a mechanism with high durability can be constituted.

As a matter of course, among the screw gears, the planetary gear and the sun outer gear have helical angles in opposite directions, and the sun inner gear has a helical angle in the same direction as that of the planetary gear and has a male-female thread relationship with the planetary gear.

The gears have gear ratios equal to each other, so that generally, the reference pitch circles and the meshing pitch circles of the sun outer gear A, the planetary gear B and the sun inner gear C are equal. Among the screw gears, in the case of normal involute gears, the normal base pitches are equal to each other, however, the gears are organized even if the helical angles are not equal to each other.

Figure 8:
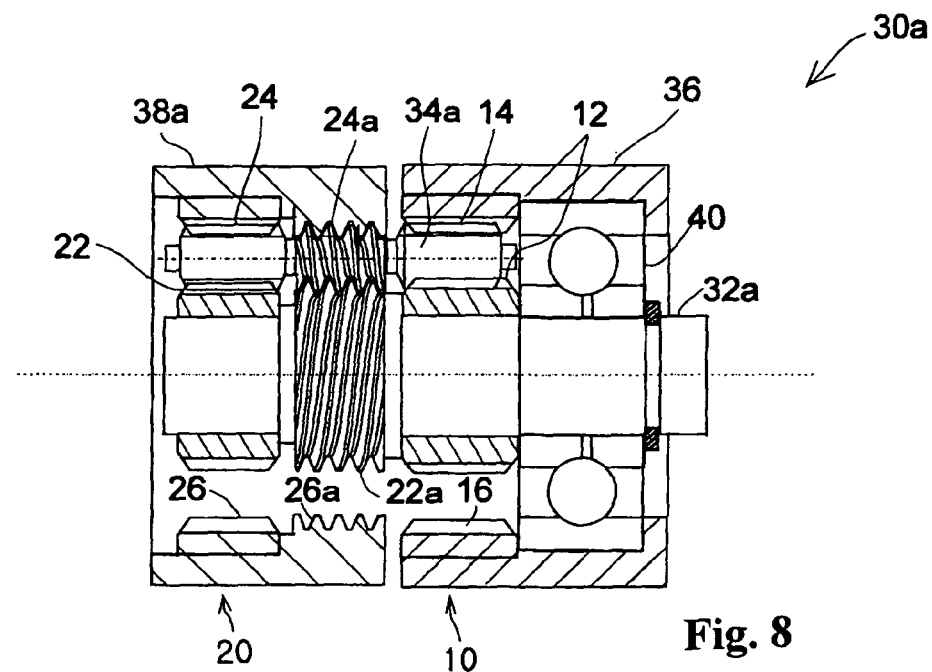
FIG. 8 is a sectional view of the 3K-I type planetary gear mechanism (Variation 1)

A detailed constitution example of the planetary gear device 30a of Variation 1 is shown in the sectional view of FIG. 8.

The planetary gear device 30a includes, substantially similar to Example 1, a sun outer gear 32s, a plurality of planetary gears 34a, and sun inner gears 36 and 38a, and the planetary gears 34a are arranged in a ring-shaped space between the sun outer gear 32a and the sun inner gears 36 and 38a. In the sun outer gear 32a and the planetary gear 34a, two pairs of gears 12 and 22 and 14 and 24 which mesh with each other are formed, respectively. In the sun inner gears 36 and 38a, gears 16 and 26 are formed, respectively.

Different from Example 1, in the sun outer gear 32a, a screw gear 22a is formed between the gears 12 and 22. In the planetary gear 34a, between the gears 14 and 24, a screw gear 24a which meshes with the screw gear 22a of the sun outer gear 32a is formed. In the sun inner gear 38a, a screw gear 26a which is adjacent to the gear 26 and meshes with the screw gear 24a of the planetary gear 34a is formed.

The gears 12, 14, 16, 22, 24, 26, 22a, 24a, and 26a of FIG. 8 correspond to the gears A, B, C, D, E, F, G, H, and I of FIG. 7.

Between the sun outer gear 32a and one sun inner gear 36, as in the case of Example 1, a bearing 40 is disposed. Between the sun outer gear 32a and the other sun inner gear 38a, different from Example 1, a bearing is not disposed.

(Variation 2)

Variation 2 will be described with reference to FIG. 9 and FIG. 10.

In Variation 2, to the novel 3K-I type planetary gear mechanism of the present invention, another gear set which shares axes with the sun outer gear and the planetary gear, and has the same gear ratio and different numbers of teeth is added in parallel.

Figure 9:
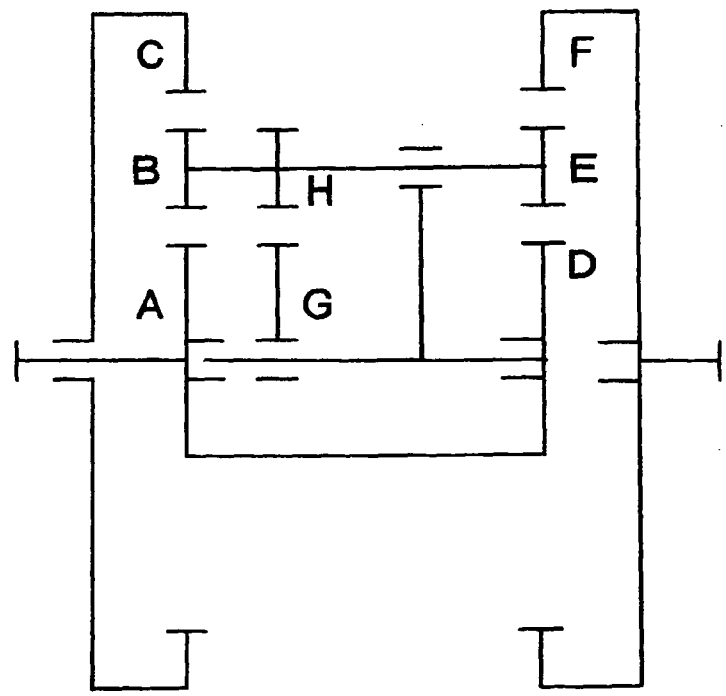
FIG. 9 is a skeleton diagram of a 3K-I type planetary gear mechanism (Variation 2)

As shown in the skeleton diagram of FIG. 9, screw gears G and H are arranged in parallel to the gears A and B with the same gear ratio. By using the screw gears G and H, the sun outer gear and the planetary gear rotates relative to each other while their relative positions in the axial direction are fixed.

Figure 10:
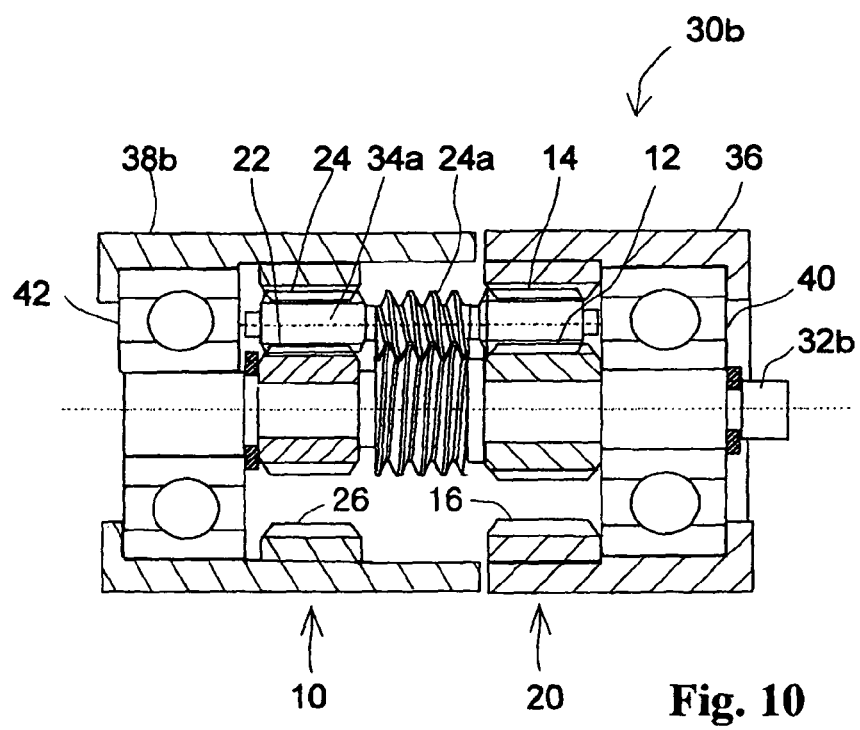
FIG. 10 is a sectional view of the 3K-I type planetary gear mechanism (Variation 2)

As shown in the sectional view of FIG. 10, the planetary gear device 30b of Variation 2 is constituted in substantially the same manner as in Variation 1. However, different from Variation 1, a screw gear is not formed in the sun inner gear 38b. Between the sun outer gear 32b and the sun inner gear 38b, a bearing 42 is disposed.

For example, in the planetary gear mechanism shown in FIG. 9, the case where the numbers of teeth Za through Zf of the gears A through F are as follows will be described.
Planetary gear mechanism 1: Za=42, Zb=21, and Zc=86
Planetary gear mechanism 2: Zd=50, Ze=25, and Zf=102

The gear ratio of the sun outer gear A and the planetary gear B of the planetary gear mechanism 1 and the gear ratio of the sun outer gear D and the planetary gear E of the planetary gear mechanism 2 are both an integer ratio of 2:1. However, the gear ratio of the sun outer gear, the planetary gear, and the sun inner gear is 42:21:86 in the planetary gear mechanism 1 and is not a ratio of small integer numbers, so that practicable screw gears cannot be formed. The same applies to the planetary gear mechanism 2.

Therefore, the screw gears with a gear (number of threads) ratio of 2:1 can be arranged in parallel between the sun outer gears and the planetary gears of the planetary gear mechanisms 1 and 2. As shown in the figure, the planetary gear G of the added screw gears is set to 1-tooth and the sun outer gear H is set to 2-teeth so as to have the same gear ratio of 2:1 as that of the other pair of planetary gear and sun outer gear, and according to the same gear ratio, the added gear aids meshing of other gears to promote smooth rotation. By the screw gears, the planetary gear and the sun outer gear are restricted from being displaced in the thrust direction (axial direction), so that the two sun outer gears and planetary gears bind each other axially. Therefore, the sun outer gear A, the planetary gear B, the sun outer gear D, and the planetary gear E, and the sun outer gear H and the planetary gear G become integral and are fixed axially, however, with respect to the integrated gears, the sun inner gear C and the sun inner gear F are not fixed axially (axial direction). Therefore, as seen in FIG. 10, the two sun inner gears and sun outer gears are made rotatable relative to each other and fixed axially by a bearing. Therefore, this gear mechanism shown in FIG. 10 has a bearing force against an axial load and performs rotation transmission.

<Novel 3K-II Type Planetary Gear Mechanism of the Present Invention>

Next, as a second embodiment, a novel 3K-II type planetary gear mechanism of the present invention will be described with reference to FIG. 11 through FIG. 13.

The 3K-II type planetary gear mechanism is a mechanism to obtain great speed reduction by setting one of two sun outer gears on a fixed axis, the other on a drive axis, and a sun inner gear on a drive axis. Specifically, by setting the sun inner gear as a rotation input (drive axis), relative rotation is generated between two sun outer gears.

Figure 11:
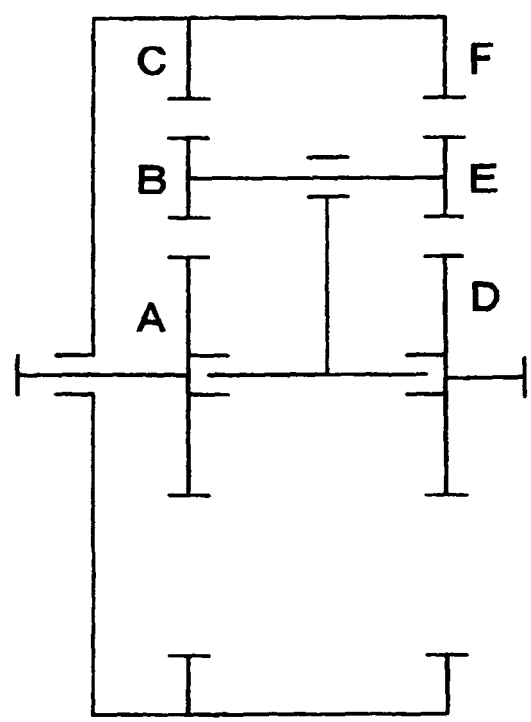
FIG. 11 is a skeleton diagram of a 3K-II type planetary gear mechanism (Example 2)

FIG. 11 is a skeleton diagram of the novel 3K-II type planetary gear mechanism of the present invention. For example, gears B and E correspond to the "first and second gears" described in claims, and gears A and D correspond to the "third and fourth gears," and gears C and F correspond to the "fifth and sixth gears."

In the novel 3K-II type planetary gear mechanism of the present invention, the degree of freedom to select the gear ratio is high. Therefore, the problems of the conventional 3K-II type planetary gear mechanism can be reduced, and it is expected to increase the use of the novel 3K-II type planetary gear mechanism of the present invention.

(Reduction Gear Ratio of 3K-II Type Planetary Gear Mechanism of the Present Invention)

In FIG. 11, first, a planetary gear mechanism consisting of gears A, B, and C is defined as a planetary gear mechanism 1, and another planetary gear mechanism consisting of the gears D, E, and F is defined as a planetary gear mechanism 2, and when the sun outer gears A and D and the sun inner gears C and F are rotated by 360 degrees relative to each other, the rotation position relationships of the sun outer gears A and D and the sun inner gears C and F with respect to the axes of the planetary gears B and E are as shown in the following Table 4.

TABLE 4

|  | planetary gear mechanism 1 | planetary gear mechanism 2 |
|---|---|---|
| position of sun outer gear | $Hs1 = Zc/(Za + Zc)$ | $Hs2 = Zf/(Zd + Zf)$ |
| position of sun inner gear | $Hr1 = Za/(Za + Zc)$ | $Hr2 = Zd/(Zd + Zf)$ |

When the sun outer gears of the planetary gear mechanism 1 are fixed, the rotation is applied between the sun outer gear of the planetary gear mechanism 1 and the sun inner gear of the planetary gear mechanism 2.

The two pairs of the sun inner gears and the planetary gears have the same gear ratio, and the sun inner gears C and F have only one rotation position with respect to the planetary gear B and E. Specifically, the position Hr2 of the sun inner gear F of the planetary gear mechanism 2 is fixed at a revolution position of the planetary gear mechanism 1.

Therefore, 360-degree relative rotation between the sun outer gear A and the sun inner gear C of the planetary gear mechanism 1 corresponds to rotation of Hr1/Hr2 of the planetary gear mechanism 2, and therefore, the position of the sun outer gear D of the planetary gear mechanism 2 is Hs2·Hr1/Hr2.

Therefore, relative rotation (speed ratio u) between the sun outer gears A and D of the planetary gear mechanism 1 and the planetary gear mechanism 2 is:

$$u = Hs1 - Hs2 \cdot Hr1/Hr2$$

and the reciprocal of this is the reduction gear ratio (K) satisfying:

$$K = 1/(Hs1 - Hs2 \cdot Hr1/Hr2) \qquad (2)$$
$$= (Za + Zc) \cdot Zd / (Zc \cdot Zd - Za \cdot Zf)$$

(Comparison Between the Reduction Gear Ratios of 3K-II Type Normal Planetary Gear Mechanism and Novel 3K-II Type Planetary Gear Mechanism of the Present Invention)

Figure 4:
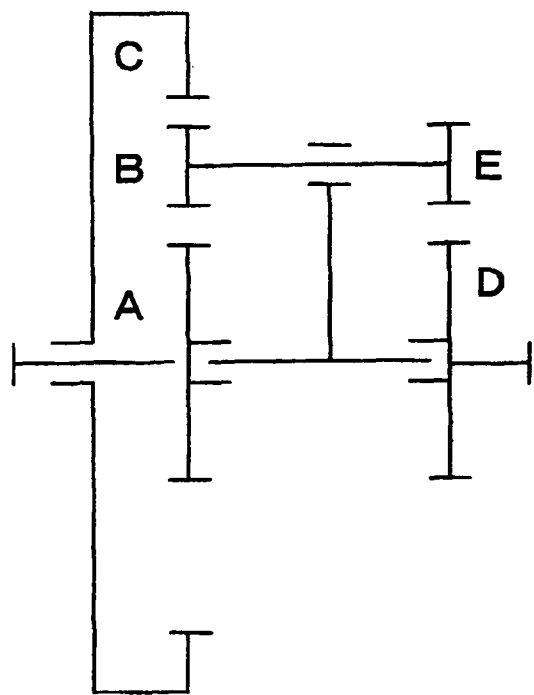
FIG. 4 is a skeleton diagram of a 3K-II type normal planetary gear mechanism (conventional example)

The reduction gear ratio (K') of the 3K-II type normal planetary gear mechanism of FIG. 4 is:

$$K' = (Za+Zc) \cdot Zb \cdot Zd/(Zb \cdot Zc \cdot Zd - Za \cdot Zc \cdot Ze) \qquad (2)'$$

This equation is more complicated than that of the reduction gear ratio of the novel 3K-II type planetary gear mechanism of the present invention, however, the 3K-II type normal planetary gear mechanism includes no gear F (with the number of teeth Zf). In the 3K-II type normal planetary gear mechanism, the position of the planetary gear is determined according to meshing among the gears A, B, and C. For making the novel 3K-II type planetary gear mechanism of the present invention correspond to the 3K-II type normal planetary gear mechanism, to prevent the meshing between the gear F and the gear E from obstructing the meshing between the gear C and the gear B, when assuming $Zf = Zc \cdot Ze/Zb$, Equation (2) is transformed as:

$$K = (Za + Zc) \cdot Zd / (Zc \cdot Zd - Za \cdot Zf) \qquad (2)$$
$$= (Za + Zc) \cdot Zd / (Zc \cdot Zd - Za \cdot Zc \cdot Ze/Zb)$$
$$= (Za + Zc) \cdot Zb \cdot Zd / (Zb \cdot Zc \cdot Zd - Za \cdot Zc \cdot Ze)$$

and Equation (2)' showing the reduction gear ratio of the K-II type normal planetary gear mechanism is derived.

In the conventional K-II type normal planetary gear mechanism, the number of arranged planetary gears of a mechanical paradox planetary gear is also limited according to the concept of the number of teeth, so that the sun inner gear F (with the number of teeth Zf) cannot be provided in a meshing state. In the novel 3K-II type planetary gear mechanism of the present invention, according to the concept that the gear ratio determines the reduction gear ratio that is the original truth, the planetary gear mechanism is considered, and a method for arranging the planetary gears is devised, whereby showing that a mechanism in which pluralities of sun outer gears, planetary gears, and sun inner gears can be arranged is possible.

(Example of Novel 3K-II Type Planetary Gear Mechanism of the Present Invention)

TABLE 5

| | planetary gear mechanism 1 | | | planetary gear mechanis 2 | | |
|---|---|---|---|---|---|---|
| type of gear | sun outer gear | sun outer gear | sun inner gear | sun outer gear | sun outer gear | sun inner gear |
| number of teeth | 27 | 9 | 45 | 31 | 10 | 50 |
| number of planetary gear | | 9 | | | 9 | |
| module | | 0.556 | | | 0.5 | |
| pressure agnle | | 30 degree | | | 30 degree | |
| helix angle | | 0 degree | | | 0 degree | |
| pitch circle diameter | 15 | 5 | 25 | 15.5 | 5 | 25 |
| tip circle diameter | 15.5 | 5.8 | 24 | 15.8 | 5.5 | 24.2 |
| root circle diameter | 13.8 | 3.9 | 26 | 14.2 | 4 | 25.8 |
| base circle diameter | 12.9904 | 4.3301 | 21.6506 | 13.4234 | 4.3301 | 21.6506 |
| coefficient of profile shift | 0 | 0 | 0 | −0.3635 | −0.1173 | −0.1173 |
| amount of profile shift | 0 | 0 | 0 | −0.1817 | −0.0586 | −0.586 |
| center distance | | 10 | | | 10 | |
| transverse operating pressure angle | | 30 | 30 | 27° 25' 2" | | 30° |
| intermeshing pitch circle diameter | 15 | 5  5 | 25 | 15.122 | 4.878  5 | 25 |

This example is close to the specifications of Table 2 shown as an example of the novel 3K-I type planetary gear mechanism of the present invention, and satisfies the following conditions:
Planetary gear mechanism 1: Za=27, Zb=9, Zc=45
Planetary gear mechanism 2: Zd=31, Ze=10, and Zf=50
Number of arranged planetary gears: 9

$$Zb:Zc=Ze:Zf$$

$$Za:Zb \neq Zd:Ze$$

Among the numbers of teeth of the planetary gear mechanism 2, the number of teeth of the sun inner gear is set to 50 in this example although it was set to 51 in Table 2, and the number of teeth of the sun outer gear is set to 31 in this example although it was set to 30 in Table 2. Therefore, the number of arranged planetary gears is the same number as 9, and these resemble the numbers of Table 2.

However, the reduction gear ratio calculated from Equation (2) is 49.6, and this is smaller than the reduction gear ratio of 136 shown as an example of the novel 3K-I type planetary gear mechanism of the present invention. In other words, the gear ratio of the novel 3K-II type planetary gear mechanism of the present invention tends to be smaller than in the novel 3K-I type planetary gear mechanism, relatively.

As seen in Table 5, all gears have the same central distance, however, the meshing pitch circle between the sun outer gear and the planetary gear is different between the planetary gear mechanism 1 and the planetary gear mechanism 2.

Profile shifting is applied dispersedly to the sun outer gear, the planetary gear, and the sun inner gear in the same manner as in the novel 3K-I type planetary gear mechanism of the present invention, and the shift coefficient is in a range efficient as a gear.

The numbers of teeth of the gears have some degree of freedom, so that as in the case of the following specifications, the reduction gear ratio can be set to a slightly large ratio such as 162.
Planetary gear mechanism 1: Za=35, Zb=11, Zc=55
Planetary gear mechanism 2: Zd=45, Ze=14, Zf=70
Number of arranged planetary gears: 5
In this case, the following relationships:

$$Zb:Zc=Ze:Zf$$

$$Za:Zb \neq Zd:Ze$$

are satisfied, so that the gear ratios of the two sun outer gears to the planetary gear are different from each other.

Therefore, by setting either of the two sun outer gears on a fixed axis and the other on a driven axis, and the sun inner gear on a drive axis, in response to a rotation input of the sun inner gear, in this example, the speed is reduced to 1/162 according to Equation (2) and outputted to the drive axis. In addition, the number of arranged planetary gears is a common divisor of the sums of the numbers of teeth of the sun outer gears and the sun inner gears of the two planetary gear mechanisms, and the sum of Za and Zc is 90 and the sum of Zd and Zf is 115, so that the number of arranged planetary gears is set to 5.

The sums of the numbers of teeth of the two sun outer gears and sun inner gears do not have no other common divisor than 5. Therefore, among all 5 planetary gears, the meshing phase relationships of the planetary gears with the sun outer gear and the sun inner gear are different from each other. Therefore, the method for arranging the planetary gears is the same as in the novel 3K-I type planetary gear mechanism of the present invention.

EXAMPLE 2

Next, a detailed constitution of the novel 3K-II type planetary gear mechanism of the present invention will be described with reference to FIG. 12.

Figure 12:
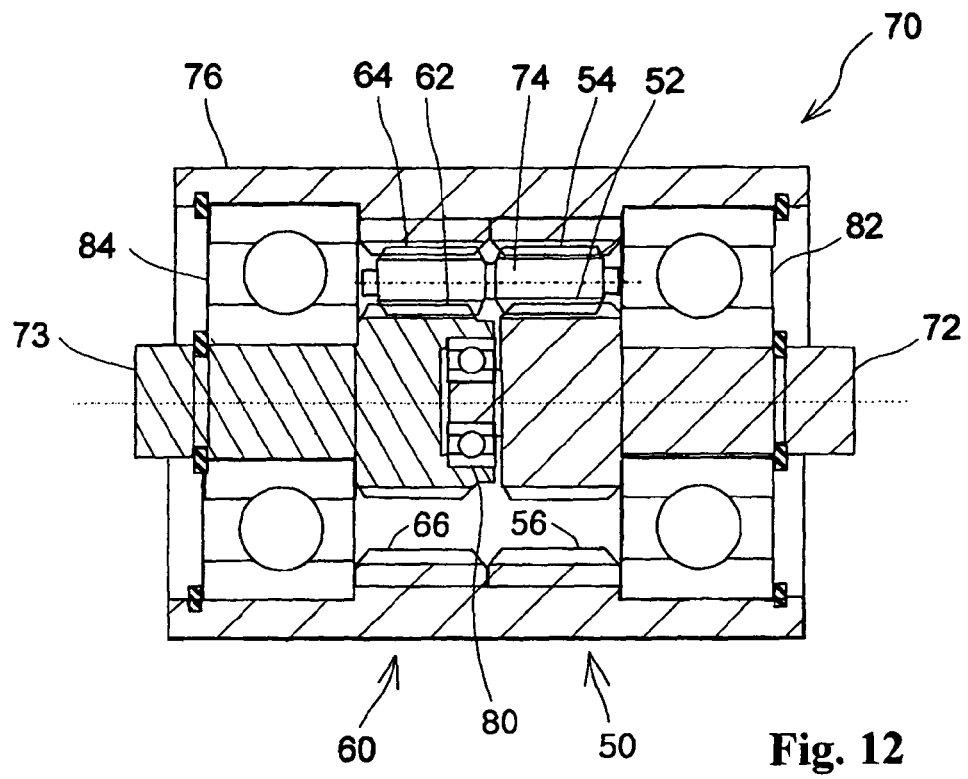
FIG. 12 is a sectional view of the 3K-II type planetary gear mechanism (Example 2)

As shown in the sectional view of FIG. 12, the planetary gear device 70 includes two sun outer gears 72 and 73, a plurality of planetary gears 74, and a sun inner gear 76, and the planetary gears 74 are arranged in a ring-shaped space between the sun outer gears 72 and 73 and the sun inner gear 76.

In the planetary gears 74 and the sun inner gear 76, two pairs of gears 54, 64 and 56, 66 to mesh with each other are formed, respectively. In one sun outer gear 72, a gear 52 which meshes with one gear of the planetary gear 74 is formed. In the other sun inner gear 73, a gear 62 which meshes with the other gear 64 of the planetary gear 74 is formed. One planetary gear mechanism 50 consists of the gear 52 of the sun outer gear 72, the gear 54 of the planetary gear 74, and the gear 56 of the sun inner gear 76, and another pair of planetary gear mechanisms 60 consists of the gear 62 of the sun outer gear 73, the gear 64 of the planetary gear 74, and the gear 66 of the sun inner gear 76. In the two pairs of planetary gear mechanisms 50 and 60, the gears 56 and 66 of the sun inner gear 76 and the gears 54 and 64 of the planetary gear 74 have gear ratios equal to each other and different numbers of teeth. In addition, the gears 52 and 62 of the sun outer gears 72 and 73 and the gears 54 and 64 of the planetary gear 74 are different in gear ratio from each other.

The two sun outer gears 72 and 73 are arranged coaxially and rotatably relative to each other. That is, the sun outer gears 72 and 73 have a convex portion and a concave portion on end faces opposite to each other, respectively, and are connected rotatably via a bearing 80 disposed between the concave portion and the convex portion.

Between the two sun outer gears 72 and 73 and the sun inner gear 76, bearings 82 and 84 are disposed. The bearings 82 and 84 are arranged on both sides of the planetary gear 74. For the planetary gear 74, a carrier is not essential, however, it is allowed that a carrier is provided to support the planetary gear 74 rotatably.

While fixing (binding) one of the two sun outer gears 72 and 73 and the sun inner gear 76, the planetary gear device 70 can transmit rotation between the other two.

For example, when the sun inner gear 76 is fixed, if one sun outer gear 72 rotates, in one planetary gear mechanism 50, the gear 54 of the planetary gear 74 revolves around the gear 56 of the sun inner gear 76 while rotating on its own axis. The gear ratios of the gears 56 and 66 of the sun inner gear 76 and the gears 54 and 64 of the planetary gear 74 are equal to each other, so that the gears 54 and 64 of the planetary gear 74 rotate integrally with respect to the gears 56 and 66 of the sun inner gear 76, and the gear 64 of the planetary gear 74 revolves around the gear 66 of the sun inner gear 76 while rotating on its own axis.

When the gear 64 of the planetary gear 74 revolves around the gear 66 of the sun inner gear 76 while rotating on its own axis, the gear 62 of the sun outer gear 73 which meshes with the gear 64 of the planetary gear 74 rotates. At this time, the gear ratios of the gears 52 and 62 of the sun outer gears 72 and 73 and the gears 54 and 64 of the planetary gear 74 are different from each other, so that the sun outer gear 73 rotates at a speed different from that of the sun outer gear 72.

(Variation 3)

Next, Variation 3 in which screw gears are added in parallel will be described with reference to FIG. 13.

Figure 13:
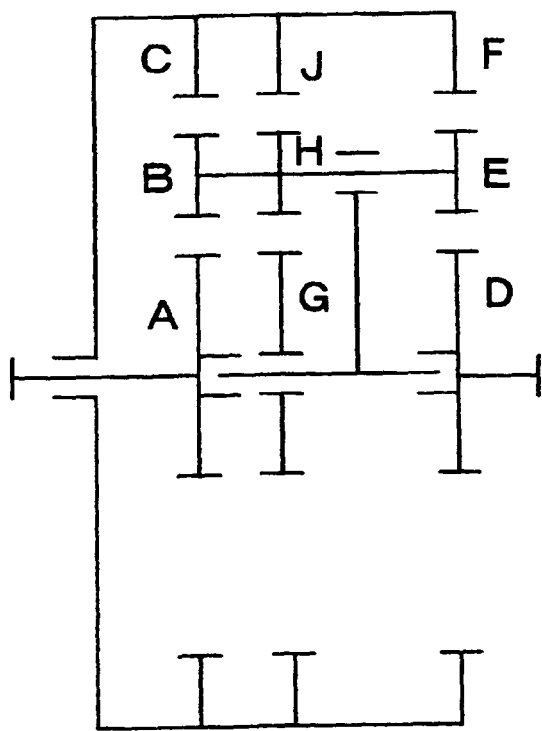
FIG. 13 is a skeleton diagram of a 3K-II type planetary gear mechanism (Variation 3)

As shown in the skeleton diagram of FIG. 13, in the constitution of FIG. 11 shown as an example of the numbers of teeth of the novel 3K-II type planetary gear mechanism of the present invention, that is, in the constitution including a planetary gear mechanism 1 consisting of gears A, B, and C and a planetary gear mechanism 2 consisting of gears D, E, and F, a planetary gear mechanism 3 consisting of screw gears G, H, and J is provided parallel to the planetary gear mechanism 1. The planetary gear mechanism 3 has a gear ratio exactly equal to that of the planetary gear mechanism 1. That is, the sun outer gear, the planetary gear, and the sun inner gear of the planetary gear mechanism 1 and the sun outer gear, the planetary gear, and the sun inner gear of the planetary gear mechanism 3 are fixed to each other.

For example, the numbers of teeth Za through Zj (excluding Zi) of the gears A through J (excluding I) and the number of arranged planetary gears are set as follows.
Planetary gear mechanism 1: Za=27, Zb=9, Zc=45
Planetary gear mechanism 3: Zg=3, Zh=1, Zj=5
Planetary gear mechanism 2: Zd=31, Ze=10, Zf=50
Number of arranged planetary gears: 9

<Planetary Gear Mechanism Using Helical Gear>

In the novel 3K-I type planetary gear mechanism of the present invention and the novel 3K-II type planetary gear mechanism of the present invention, helical gears can be used. Hereinafter, a detailed constitution will be described.

EXAMPLE 3

Figure 14A:
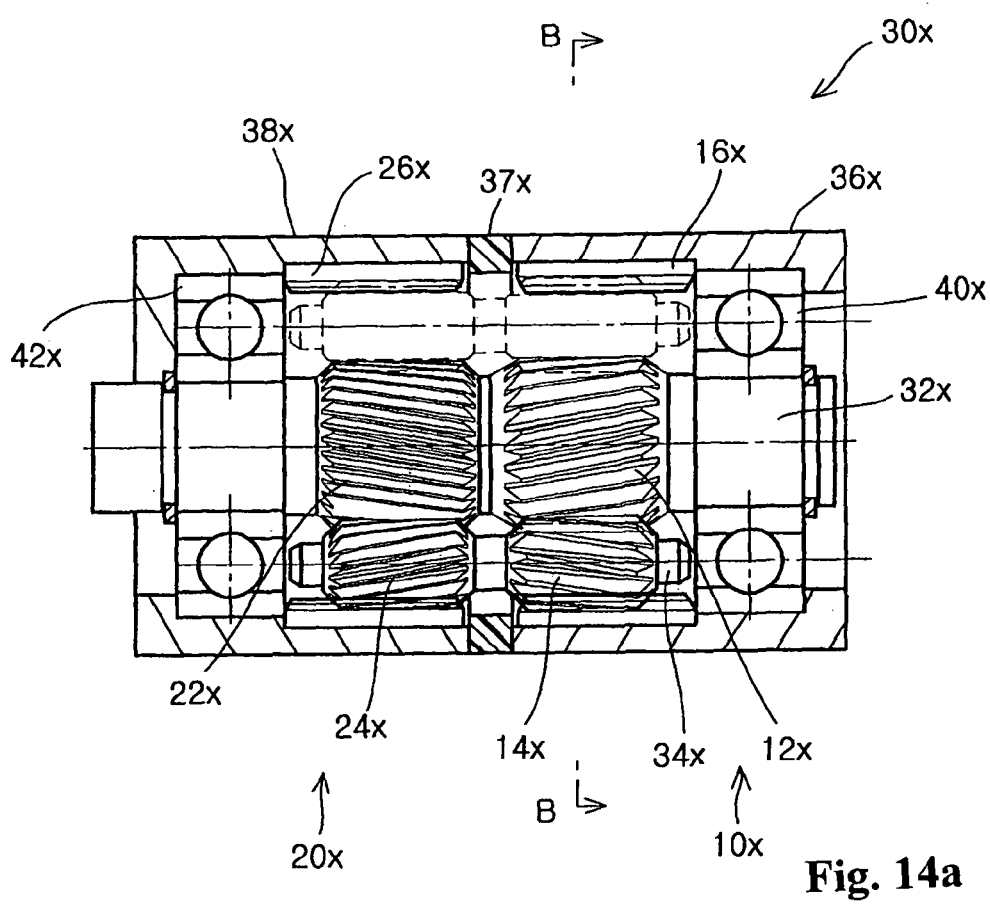
FIG. 14a is a sectional view of the 3K-I type planetary gear mechanism (Example 3)
Figure 14B:
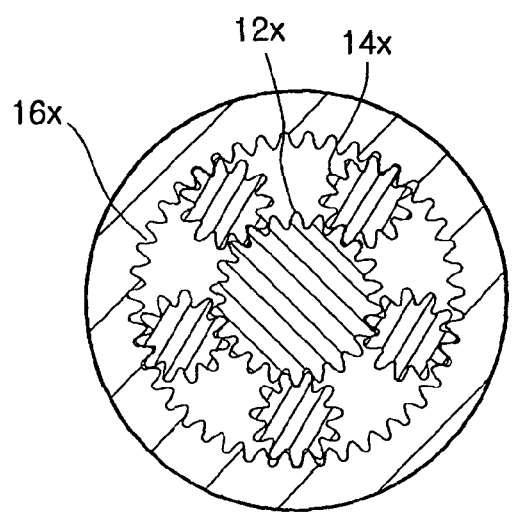
FIG. 14b is a sectional view of the 3K-I type planetary gear mechanism (Example 3).

A planetary gear device $30x$ of Example 3 will be described with reference to FIG. 14a and FIG. 14b. FIG. 14a is a sectional view showing the constitution of the planetary gear device $30x$. FIG. 14b is a sectional view along the line B-B of FIG. 14a.

The planetary gear device $30x$ is the novel 30K-I type planetary gear mechanism of the present invention. As shown in FIG. 14a, in the sun outer gear $32x$, the planetary gear $34x$, and the sun inner gears $36x$ and $38x$, helical gears $12x$ and $22x$, $14x$ and $24x$, and $16x$ and $26x$ being helical opposite to each other are formed, respectively. Between the sun outer gear $32b$ and the sun inner gears $36x$ and $38b$, bearings $40x$ and $42x$ are disposed. For example, one sun inner gear $36x$ is fixed so as not to rotate and move axially. The other sun inner gear $38x$ is rotatable. The helical gears $16x$ and $26x$ of the sun inner gears $36x$ and $38x$ mesh with the helical gears $14x$ and $24x$ of the planetary gear $34x$, so that the axial positions of the sun inner gears $36x$ and $38x$ are maintained constantly. Between the sun inner gears $36x$ and $38x$, an oil seal $37x$ is disposed so as to prevent oil inside the planetary gear device $30x$ from leaking.

For example, the numbers of teeth of the gears $12x$, $14x$, and $16x$ of one planetary gear mechanism $10x$ are 22, 11, and 43, respectively. The numbers of teeth of the gears $22x$, $24x$, and $26x$ of the other planetary gear mechanism $20x$ are 32, 16, and 63, respectively. The number of arranged planetary gears $34x$ is 5. In this case, the reduction gear ratio is 409.5, and this is extremely great.

The planetary gear device $30x$ can receive a load in the axial direction by meshing between the helical gears being helical in directions opposite to each other, and even if a stopper or a carrier is not provided, the planetary gears $34$ can be stably held, and smooth driving is realized. In addition, the number of simultaneous meshes in the axial direction increases, so that the noise from the gear device is small, and the load bearing is improved. In the planetary gear $34x$, the helical gears $14x$ and $24$ are provided, so that in comparison with the case of spur gears, the inclination and concentric wearing around the central axes of the sun gears $32x$, $36x$, and $38$ can be reduced.

The sun outer gear $32x$ and the planetary gear $34x$ are both formed so as to have two different gears $12x$ and $22x$ and $14x$ and $24x$ integrally, respectively. Therefore, it is possible that the phase relationship between the planetary gear $34x$ and the sun outer gear $32x$ is fixed so that these gears mesh with each other and a plurality of planetary gears $34x$ in the same shape are arranged. The planetary gear device $30x$ is assembled by, for example, assembling one planetary gear mechanism $20x$ side and meshing the helical gear $14x$ of the planetary gear $34x$ exposed at a predetermined position with the sun inner gear $36x$ of the other planetary gear mechanism $10x$ while twisting.

(General Overview)

As described above, according to the novel 3K-I type planetary gear mechanism of the present invention and the novel 3K-II type planetary gear mechanism of the present invention, the problems of the conventional devices can be solved by providing a novel planetary gear mechanism mechanically different from the conventional mechanism. That is, looking back on the gear reduction theory as the root of the reduction gear mechanisms and the theory of the mechanical paradox gear mechanism, a planetary gear mechanism which is newly proposed is provided. In a mechanical paradox planetary gear, two gears with different numbers of teeth attached to one axis mesh with another common gear, however, in the novel 3K-I type planetary gear mechanism of the present invention and the novel 3K-II type planetary gear mechanism of the present invention, not one gear but gears with different numbers of teeth formed integrally are provided on a planetary gear axis and for the two planetary gears, gears with gear ratios different from each other are provided in the sun outer gear or the sun inner gear.

The novel 3K-I type planetary gear mechanism of the present invention and the novel 3K-II type planetary gear mechanism of the present invention can solve the problems of the conventional devices. That is, the degree of freedom of the reduction gear ratio in design increases, and as a result, the number of arranged planetary gears can be increased, a high torque can be transmitted, a greater reduction gear ratio is realized, and high efficiency is realized.

In other words, in the planetary mechanism, the number of arranged planetary gears is not one, so that many meshes are obtained, and a high torque can be transmitted. In addition, according to the theory of gear ratio, a great reduction gear ratio can be realized without lowering the strength of the teeth. In addition, it works on the principle that the gear ratios with respect to the planetary gear are different, so that as the gear ratios get closer to each other, and the reduction gear ratio becomes greater in principle. Generally, gears which obtain a great reduction gear ratio have, the reference pitches of the gears have a relationship in that the greater the size difference, that is, the greater the gear ratio is, the greater the reduction gear ratio is. However, according to the present invention, the smaller the gear ratio difference, the greater the reduction gear ratio. The gear of the present invention works in response to a gear ratio difference, and it works according to not a gear ratio but a gear ratio difference, so that it has no relation to the gear size ratio.

In addition, if a great speed reduction gear is set in the conventional device, the gear ratio increases, and it strains the gear. In the case of a gear with great speed reduction, the module becomes smaller and the strength becomes weaker, however, these can be prevented in the present invention.

The higher the speed reduction becomes, the greater the transmitting torque. If the gear ratios are different, due to a rotation speed ratio difference, a twisting torque is caused in the planetary gears, and it causes the teeth to be broken. In the present invention, the greater the reduction gear ratio, the smaller the rotation speed ratio of the planetary gear. Therefore, the greater the reduction gear ratio, the more excellent the durability. This is contrary to the normal case where the greater the reduction gear ratio, the lower the durability.

The number of arranged planetary gears is set to be larger than in the conventional technique, different phase arrangement is formed, and meshes of only tooth flanks with each other essential for durability can be realized. In the conventional technique, the possible number of arranged planetary gears is limited by the number-of-teeth difference between gears which mesh with the planetary gear. However, in the present invention, according to the gear ratio theory, the possible number of arranged planetary gears can be set with a higher degree of freedom than in the conventional technique, so that the number of arranged planetary gears can be set to be large. In addition, these can be meshed with each other in phases different from each other.

The large number of arranged planetary gears is suitable for high torque transmission. By meshing the planetary gears with each other in different phases, as a gear, a torque can be transmitted on the tooth flanks, and for example, collision between the tooth bottom and the tooth tip can be prevented. In other words, the gear always works so that meshing between the sun and the inner gear maintains the central distance, and the revolving orbit of the planetary gear hardly deflects. Therefore, the carrier of the planetary gear can be omitted.

The present invention is not limited to the above-described embodiments, and can be variously changed and carried out.

For example, the shape of the gear is not limited to a general involute gear, but may be a cycloid tooth profile or an arc-tooth profile. In addition, without limiting to the spur gear, it may be a helical gear or a bevel gear.

What is claimed is:

1. A planetary gear device comprising:
   a 3K type planetary gear mechanism which includes a sun outer gear, a sun inner gear, and a planetary gear, where two of three fundamental axes of a drive axis, a driven axis, and a fixed axis are assigned to one of the sun outer gear and the sun inner gear, the other one fundamental axis is assigned to the other of the sun outer gear and the sun inner gear, and performs speed increase and reduction by rotation transmission, wherein
   the planetary gear includes at least two first and second gears with different numbers of teeth coaxially and integrally;
   the one of the sun outer gear and the sun inner gear to which two of the fundamental axes are assigned includes at least two third and fourth gears which mesh with the first and second gears of the planetary gear, respectively, and can rotate relative to each other,
   the gear ratio of the first gear and the third gear is different from that of the second gear and the fourth gear,
   the other one of the sun outer gear and the sun inner gear to which one of the fundamental axes is assigned includes coaxially and integrally at least two fifth and sixth gears which mesh with the first and second gears of the planetary gear, respectively,
   the gear ratio of the first gear and the fifth gear and the gear ratio of the second gear and the sixth gear are equal to each other,
   the number of teeth of the first gear is different from that of the second gear,
   the number of teeth of the fifth gear is different from that of the sixth gear, and
   at least one of the planetary gears meshes with its respective sun outer gear and sun inner gear in a different phase than the other planetary gear with its respective sun outer gear and sun inner gear.

2. The planetary gear device according to claim 1, wherein two of the drive axis, the driven axis, and the fixed axis of the three fundamental axes are assigned to the sun outer gear, and the other one fundamental axis is assigned to the sun inner gear.

3. The planetary gear device according to claim 1, wherein two of the drive axis, the driven axis, and the fixed axis of the three fundamental axes are assigned to the sun inner gear, and the other one fundamental axis is assigned to the sun outer gear.

4. The planetary gear device according to claim 1, wherein the planetary gear includes a plurality of pairs whose phases of meshing with the sun outer gear and the sun inner gear are different from each other, arranged at equiangular intervals.

5. The planetary gear device according to claim 1, wherein the first and second gears of the planetary gear have central distances equal to each other and mesh with the sun outer gear and the sun inner gear.

6. The planetary gear device according to claim 1, wherein
   the meshing pitch circle of the first gear and the fifth gear and the meshing pitch circle of the second gear and the six gear which have gear ratios equal to each other are equal to each other, and
   the meshing pitch circle of the first gear and the third gear and the meshing pitch circle of the second gear and the fourth gear which have gear ratios different from each other are different from each other.

7. The planetary gear device according to claim 1, wherein when the number of teeth of the sun inner gear is different from the sum of two times the number of teeth of the planetary gear and the number of teeth of the sun outer gear, at least one of the planetary gear and the sun outer gear is subjected to profile shifting.

8. The planetary gear device according to claim 1, wherein the planetary gears are arranged at equiangular intervals around the inner and outer sun gears, and the number of planetary gears and the number of teeth of the planetary gear are relatively prime numbers.

9. The planetary gear device according to claim 1, wherein a rotation bearing mechanism is provided between the sun outer gear and the sun inner gear.

10. The planetary gear device according to claim 1, wherein
   the planetary gear includes at least one seventh gear different from the first and second gears, coaxially and integrally, and
   in at least one of the sun outer gear and the sun inner gear, an eighth gear which meshes with the seventh gear is formed.

11. The planetary gear device according to claim 1, wherein
the planetary gear includes at least one gear different from the first and second gears, coaxially and integrally, and one or more of the three or more gears that the planetary gear includes coaxially and integrally are screw gears, and the screw gears mesh with at least one or both of the sun outer gear and the sun inner gear.

12. The planetary gear device according to claim 1, wherein
when the numbers of teeth of the first through fourth gears are defined as Z1 through Z4, the imaginary numbers of teeth increased or reduced from the numbers of teeth Z3 and Z4 of the third and fourth gears are defined as Z3' and Z4', all of the following:
(a) Z1:Z3'=Z2:Z4'
(b) |Z3-Z3'|=1 or 2
(c) |Z4-Z4'|=1 or 2
are satisfied.

13. The planetary gear device according to claim 1, wherein the first gear and the second gear, the third gear and the fourth gear, and the fifth gear and the sixth gear are helical gears being helical in directions opposite to each other.

* * * * *